United States Patent [19]

Murray

[11] Patent Number: 5,699,089

[45] Date of Patent: Dec. 16, 1997

[54] CENTRAL CONTROL FOR SEQUENTIAL-PLAYBACK OBJECTS

[75] Inventor: Douglas G. Murray, Redmond, Wash.

[73] Assignee: Applied Voice Technology, Kirkland, Wash.

[21] Appl. No.: 205,866

[22] Filed: Mar. 3, 1994

[51] Int. Cl.⁶ ...................................................... G09G 5/08
[52] U.S. Cl. ........................... 345/146; 345/902; 395/978
[58] Field of Search ................................... 345/145, 146,
345/156, 902, 112, 118, 119, 122, 203;
364/514 R, 188; 395/126, 133, 152, 153,
154, 155, 156, 157, 159, 161, 600, 326–328,
978, 806, 880; 358/296; 370/81; 360/83;
84/645; 369/13

[56] References Cited

U.S. PATENT DOCUMENTS

| | | | |
|---|---|---|---|
| 4,868,687 | 9/1989 | Penn et al. ................................. | 360/13 |
| 4,998,272 | 3/1991 | Hawkins, Jr. . | |
| 5,029,200 | 7/1991 | Haas et al. . | |
| 5,065,345 | 11/1991 | Knowles et al. .......................... | 395/806 |
| 5,109,482 | 4/1992 | Bohrman ................................... | 395/328 |
| 5,119,474 | 6/1992 | Beitel et al. .............................. | 395/161 |
| 5,127,003 | 6/1992 | Doll, Jr. et al. . | |
| 5,128,982 | 7/1992 | Dugdale et al. . | |
| 5,172,404 | 12/1992 | Hashimoto . | |
| 5,177,780 | 1/1993 | Kasper et al. . | |
| 5,187,735 | 2/1993 | Herrero Garcia . | |
| 5,208,421 | 5/1993 | Lisle et al. ................................ | 84/645 |
| 5,243,643 | 9/1993 | Sattar et al. . | |
| 5,247,568 | 9/1993 | Bergsman et al. . | |
| 5,249,289 | 9/1993 | Thamm et al. ............................ | 395/600 |
| 5,274,738 | 12/1993 | Daly et al. . | |
| 5,278,897 | 1/1994 | Mowery et al. . | |
| 5,333,299 | 7/1994 | Koval et al. .............................. | 395/880 |
| 5,365,502 | 11/1994 | Misono ..................................... | 369/18 |
| 5,390,138 | 2/1995 | Milne et al. .............................. | 395/326 |
| 5,428,730 | 6/1995 | Baker et al. .............................. | 395/154 |
| 5,459,581 | 10/1995 | Ohyanasi .................................. | 358/296 |
| 5,467,288 | 11/1995 | Fasciano et al. ......................... | 364/514 R |
| 5,500,859 | 3/1996 | Sharma et al. ........................... | 370/81 |
| 5,553,220 | 9/1996 | Keene ....................................... | 345/203 |
| 5,557,724 | 9/1996 | Sampat et al. ........................... | 395/978 |
| 5,586,216 | 12/1996 | Degen et al. ............................. | 395/2.85 |

OTHER PUBLICATIONS

"Remark!™ Voice Integration for Microsoft Windows™", Simpact, Associates, Inc. (no date).

Primary Examiner—Steven Saras
Attorney, Agent, or Firm—Sheridan Ross P.C.

[57] ABSTRACT

Sequential-playback objects (SPOs) such as audio messages, voicemail messages, video segments and the like are controlled in a centralized fashion in a computer-based system. The user is able to select SPOs, preferably using a pointer device such as a mouse. A single tool bar is displayed and used for controlling each of the selected SPOs so that there is no need to display two tool bars on the screen for controlling two different SPOs. Information relating to the status and characteristics of the SPOs are passed to the tool bar software so that the tool bar automatically provides the appropriate command execution for the particular SPO. Thus, the same tool bar will playback a video message or an audio message. By providing a single tool bar, screen clutter is reduced and, command execution is performed rapidly and computer resources are conserved.

23 Claims, 20 Drawing Sheets

CENTRAL CONTROL FOR SEQUENTIAL-PLAYBACK OBJECTS

The present invention is directed to a computer-based method and apparatus for centralized control of sequential-playback objects and in particular to methods and apparatus permitting a computer to control the playback, recording, rewinding and other positioning of sequential playback objects such as voicemail messages and video sequences.

BACKGROUND OF THE INVENTION

As computers, and particularly personal, desktop, laptop or handheld computers, are used in connection with various types of communication and/or data storage, it has become increasingly important to provide for control of the communication and stored information in a manner which is efficient, easy to learn and easy to use. Among the various information objects which can be manipulated or controlled using a computer, are sequential-playback objects (SPO), i.e., objects which, in normal use, are reproduced, played or displayed in a predetermined preferred time sequence, having a beginning, a middle and an end. Examples include audio objects such as recorded or stored voicemail messages, document audio annotation, and soundtracks of audio-visual objects such as audio-visual presentations (similar to "slide shows" or "videos"). Examples also include sequential playback video objects such as recorded or stored television or motion picture programs, and video portions of audio-visual objects such as presentations. Because of the nature of these objects which have beginning, middle and ending portions, these objects can be controlled using control commands such as "play" (to initiate reproduction or playback of the recorded or stored object, in sequence, either from the beginning of the sequence or from some point in the middle), a stop command (to cease or suspend playback), a record command (to initiate recording or storing of new sequential-playback information) and positioning commands such as rewind, fast-forward, return-to-beginning, or move-to-end. When a computer is used to execute such controls, it is convenient to perform such control in conjunction with a video display. This is often performed in conjunction with a so-called "pointing" device. One common pointing device is a mouse which, when moved by the user, causes a corresponding movement of a cursor on the display to permit selection of a displayed indicator. Selection can occur by, for example, moving the cursor over the indicator and depressing a button. Other types of pointing devices include stylus-type pointers (e.g., those found in pen-based computers) and touch-sensitive screens to permit pointing using, for example, the user's finger. Items can also be selected using the keyboard to, for example, select items from a menu of displayed items. Other means of selecting include voice-command recognition, eye-tracking, virtual-reality gloves and the like. Any of these selection means can be used to select one or more of the controls described above.

Commonly, a computer system configured for use in connection with sequential playback objects has the capability of controlling more than one sequential playback object. For example, a computer which is configured for controlling voicemail objects can typically control any of a plurality of recorded or stored voicemail messages. Previous methods for controlling multiple sequential-playback objects suffer from certain deficiencies. As shown in FIG. 1, some previous devices permitted a user to control a particular sequential object by first displaying, on the screen, certain control indicators. In one common system, the indicators are displayed in a rectangular region or window 12 of the screen 14. In the depiction of FIG. 1, the window 12 includes a display of the name 16 of the sequential object to be controlled by the control devices in the window 12, a display 18 of the current-playback-starting location within the file and a plurality of control indicators such as a playback control indicator 22a, a stop control indicator 22b, a record control indicator 22c, a fast-forward control indicator 22d and a rewind control indicator 22e.

In the depiction of FIG. 1, when the user wishes to control a second object, the user has two choices. The user could reconfigure the window 12 so that it is configured for controlling a different object (e.g., by selecting "file" 24, and entering a new file name). However, this procedure can be inconvenient if the user does not wish to give-up the option of easily returning to control of the first playback object. Thus, according to another option, a user can open a second window 12'. When the second window 12' is opened, it will contain a display similar to the display of window 12, although the display of the name 16' of the object to be controlled will be different. In particular, the second window 12' has its own set of controls 22a' through 22e'. Typically, only one of the windows 12, or 12', will be "active" (i.e., able to perform one of the control functions) at any given time. Often there will be a visual indication of which window is active, such as by a highlighting 26.

As can be seen from FIG. 1, each window 12, 12' contains its own set of command or tool indicators (sometimes referred to as a "tool bar"). This leads to a number of undesirable results. It contributes to screen clutter since the windows are larger than they otherwise would be. It is also believed that providing a separate tool bar in each window contributes to undesirable delay and use of computer resources, i.e., results in a configuration in which execution of commands is not as rapid as desired and which uses more computer memory, buffers, interrupt locations and the like than desired.

Accordingly, it would be useful to provide a method and apparatus for controlling multiple sequential-playback objects which provides for ease of use, reduction of screen clutter, rapidity of command execution and conservation of computer resources.

SUMMARY OF THE INVENTION

The present invention includes a recognition of the deficiencies and problems with previous approaches, including those noted above. According to the present invention, these problems are addressed by providing a single tool bar which can be used to control playback of any of a plurality of sequential-playback objects. Unlike the approach depicted in FIG. 1, the present invention does not provide a plurality of tool bars 23, 23', one for each object which is to be controlled. Instead, the user selects one of a plurality of sequential-playback objects and uses a tool bar to control that object (such as by initiating playback). When the user wishes to control another sequential-playback object, the user selects that object (e.g., from a list). However, such selection does not cause the display of a second tool bar. Instead, the user can use the same tool bar which was used for controlling the first object, in order to control the second object.

In order to use the single tool bar to control multiple sequential-playback objects, the present invention includes tracking information related to the various objects and coupling that information to the tool bar in such a manner that, when a tool from the tool bar is selected, the corresponding function or command will be applied to the correct sequential-playback object (SPO) and, moreover, will be executed in the proper fashion, e.g., beginning at the proper playback time. For example, if the user, after listening to the first ten seconds of a voicemail message, selects a second voicemail message, the present invention will store information relating to the 10-second elapsed-time on the first message. In one embodiment, the present invention also stores the command status (e.g., playback, record) that was in effect at the time the first message was de-selected. In this manner, if the user later returns to the first message, the user can automatically begin playing back where he left off, i.e., beginning at the 10-second elapsed-time location. It is for reasons such as this that using a single tool bar to control multiple SPOs require the solution of problems which would not be encountered if one attempted to, for example, use a single tool bar to control a object which is not a sequential-playback object, or to use multiple tool bars.

Preferably, the method and apparatus are configured so that there is coordination between control of different SPOs. For example, in one embodiment, if the user selects a second SPO during the time when playback of a first SPO is occurring, such selection will automatically suspend the playback of the first SPO.

Preferably, the same tool bar can be used for controlling different types of SPOs, i.e., for controlling SPO's which have different characteristics. For example, in one embodiment, the same tool bar can be used for playing back a voicemail message, for playing back the user's voicemail "personal greeting", for playing back audio e-mail messages, for playing back video messages ("v-mail"), for playing back audio-visual presentations, and the like. In one embodiment, the object (i.e., the recorded or stored digital information making up the sequential playback object) includes information regarding its characteristics (e.g., whether it is audio or video, storage format, normal or preferred playback speed and the like).

DESCRIPTION OF THE PREFERRED EMBODIMENT

Figure 2:
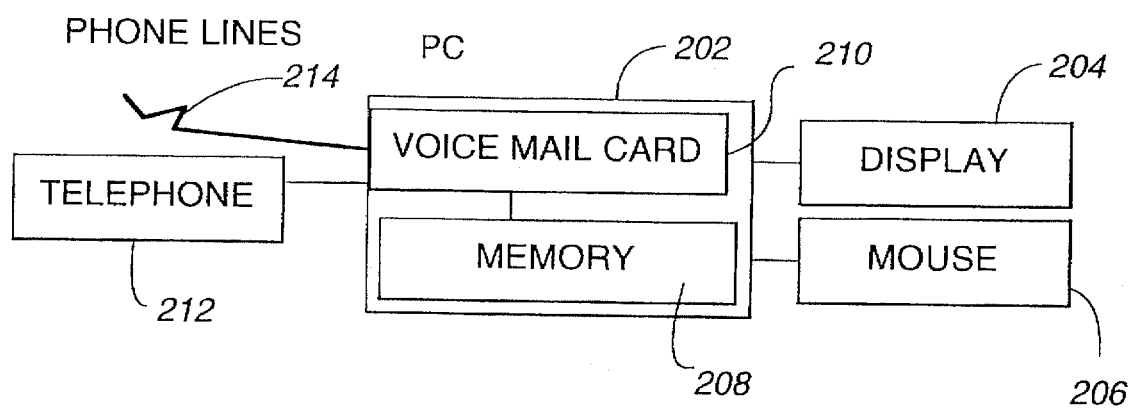
FIG. 2 is a block diagram of a telephone/computer system useable in connection with the present invention.

The present invention can be used in connection with a number of system configurations, ranging from simple, single-station configurations to complicated networked configurations. FIG. 2 depicts one configuration useable in connection with the present invention. In FIG. 2, a computer such as a personal computer (PC) 202 is connected to a video display 204 and a user input device, preferably including a pointer device such as a mouse 206. The computer 202 includes memory 208, for general computer use as well as for storing objects such as digitized voicemail messages, and circuitry for receiving, storing and playing back SPO's, such as a voicemail board 210, connected to a single telephone 212 and an ordinary telephone line 214. A number of types of hardware can be used in this regard. In one embodiment the PC is a IBM-compatible 486 computer, configured to run Microsoft® Windows™ software. The voicemail board is a model D/41D available from Dialogic Corporation, the display is a SVGA display, and the mouse is a Microsoft® mouse.

Figure 3:
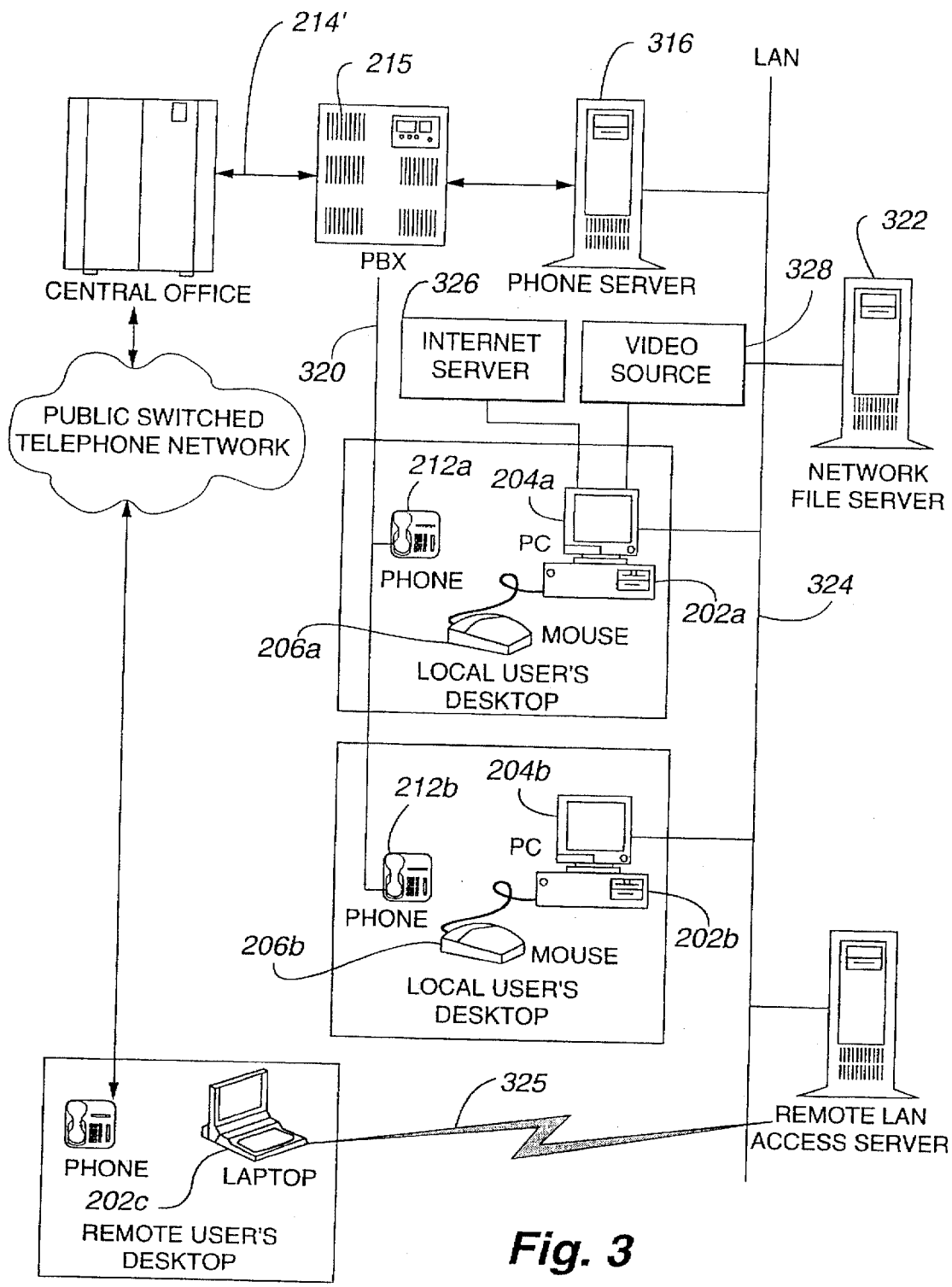
FIG. 3 depicts a telephone/computer network system useable in connection with the present invention.

FIG. 3 depicts a more complex system which can also be used in connection with the present invention. In FIG. 3, the phone line 214's PBX 215 and server 316 may be multiple line devices. Rather than connecting directly to a telephone, the phone line 214' is connected via a private branch exchange (PBX) 215 to a phone server, i.e., a computer configured for receiving telephone calls, routing the calls to the correct location and, in some cases, recording and storing voice and other audio messages. In one embodiment, the phone server includes a fax board so that the phone server can receive fax calls which can be stored and delivered to PCs 202a, 202b, 202c, e.g., via a communication line 324. Each PC 202a, 202b is connected to a display 204a, 204b, and mouse 206a, 206b as in FIG. 2. Each PC may also be in communication with a telephone 212a, 212b via network cabling 324, 320. The telephone 212a, 212b may be an ordinary user set or may be a telephone set configured particularly for use in connection with the phone server 316. Other embodiments could include a direct connection between the telephone and the PC. In the depicted embodiment, each phone 212a, 212b is connected to the server 316 via a line 320. Although the PC's 202a, 202b can be entirely independent, they can also be connected on a network, using a network server 322 coupled over a network communication link 324 (which can be either physical media or, for example, a radio link, IR link, or modem link 325). In addition, the computers 202a, 202b, 202c can be connected with other information links such as a wide area network server, an internet server 326 and/or a video source such as a video camera or video conferencing equipment 328.

In the embodiment of FIG. 2, the PC 202 may handle only a limited number of types of SPO's, e.g., voicemail messages and personal greetings. In the embodiment of FIG. 3, the PC's 202a, 202b may deal with a wider variety of SPO's, including e-mail audio or video messages, e.g., delivered over the network 324, audio, video or audio-visual files downloaded from the internet server 326, and/or video or audio-video information from the video or video conferencing source 328; in addition to voice mail objects.

Figure 4:
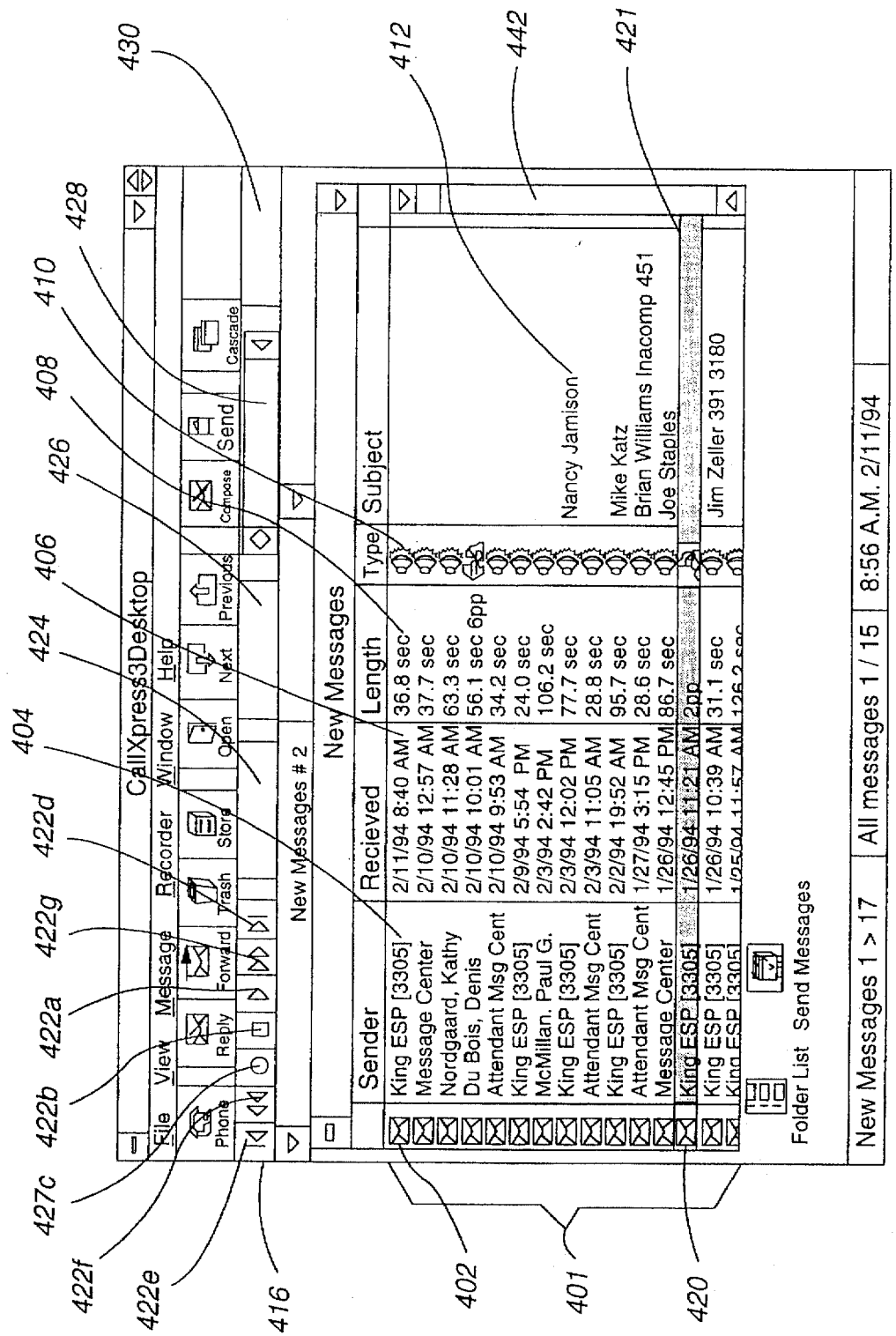
FIG. 4 depicts the appearance of a computer video screen for selection of sequential-playback objects, according to one embodiment of the present invention.

FIG. 4 depicts the appearance of a screen that can be used, according to an embodiment of the present invention, in connection with handling SPO's. In the embodiment of FIG. 4, the screen displays a plurality of identifiers of various objects. In this embodiment, the identifiers are displayed as a list 401. In the embodiment of FIG. 4, each identifier in the list includes an icon 402, e.g., to indicate the opened or unopened status of the object, a sender field 404, to indicate the identity of the sender of the message, a time 406 to indicate the receipt time, a length 408 to indicate the length of the message, a second icon 410 to indicate the type of object (voicemail, fax, e-mail, etc.) and a field 412 for indicating the subject of the object. Preferably, the sender identity 404 is obtained automatically, e.g., using information regarding the internal origin of the message or, e.g., caller identification apparatus. The subject 412 may be obtained automatically but, in most cases, will be entered either by the sender or by the receiver. In the embodiment of FIG. 4, the objects which are displayed include both SPO's (such as voicemail messages and audio e-mail messages) and non-SPO's (such as fax messages).

Figure 5:
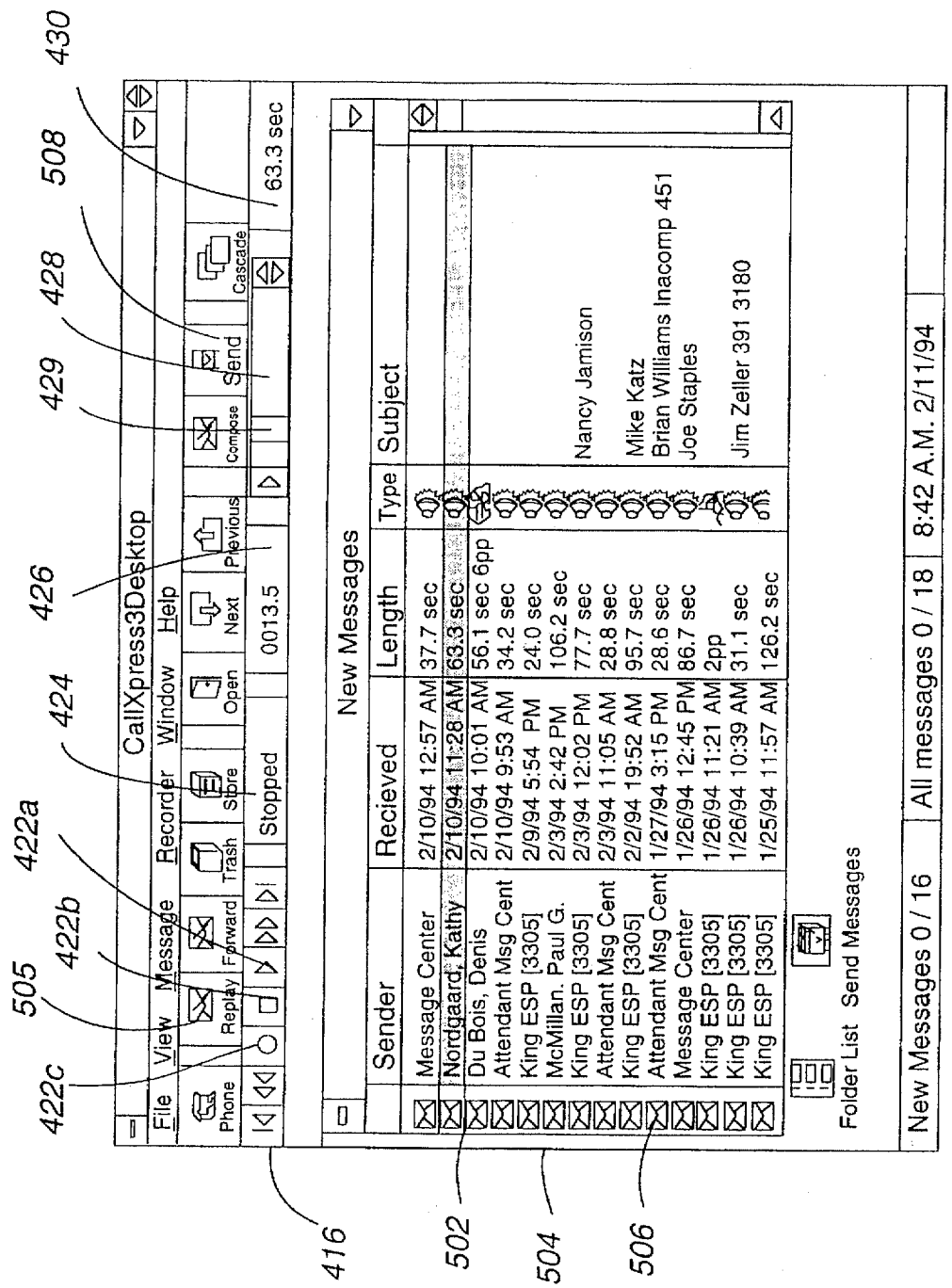
FIG. 5 depicts the appearance of a computer video screen for selection of a second sequential-playback object, according to one embodiment of the present invention.

In the embodiment depicted in FIG. 4, a tool bar 416 is also displayed. In the embodiment depicted in FIG. 4, the tool bar 416 includes control indicators for indicating a playback command 422a, stop command 422b, record command 422c, advance-to-end 422d, return-to-beginning 422e, rewind 422f, and fast forward 422g. Additional controls can also be provided including, for example, volume control, speed control, graphic wave form display, volume display, status display (stop, recording, pause) video color adjustment, (hue, saturation), image contrast, and brightness. In the situation depicted in FIG. 4, however, the tool bar is displayed in such a fashion as to indicate to the user that it is not currently useable. In the situation of FIG. 4, this is because the item which is currently selected is a non-SPO, namely a fax message 420. In the embodiment of FIG. 4, the currently-selected object is indicated by highlighting 421. The non-useable state of the tool bar 416 is indicated by displaying the tool indicators 422a through 422g in a dulled or grayed display mode and by displaying empty information fields 424, 426, 428, 430. FIG. 5 depicts the appearance of the screen after the user has selected an SPO object 502. As seen in FIG. 5, the tool bar 416 is shown in a darkened or highlighted state and the information fields contain information showing the status of the playback 424 (in this case "stopped"), the current location, in the sequential object of the playback 426, a visual indication 428 of the location (e.g., by depicting a slider bar, as shown) and an indication 430 of the total length of the selected object. At this point, the user has the option of selecting one of the controls from the control bar 416 to act upon the selected message 502. If the user selects the playback control 422a, the computer will begin playback of the SPO indicated by indicator 502, beginning from the current position, i.e., the position indicated by indicators 426 and 428.

The user may, if desired, then select another one of the SPO's. Preferably, if the user selects a second SPO during the time that a command is executing on a first SPO, such selection of the second SPO will automatically suspend the execution of the command on the first SPO. For example, if the first SPO 502 is in the process of playing back at the time the user selects a second SPO 504, the playback of the first SPO 502 will automatically stop and the location within the sequential object (i.e., the location indicated by 426 and 428) and, preferably, the status ("playback") will be stored. If the user is recording a first SPO 502 at the time the user selects a second SPO 504, the recording will similarly stop and the location (and, preferably, status) will be stored. The user can also select a second SPO during the time when no command is being executed with respect to the first SPO 502.

After selecting the second SPO 504, the user can use the same tool bar 416 to execute commands with respect to the second SPO 504. In order to accomplish this result, it is necessary for the software which responds to selection of a tool from the tool bar 416 to have access to information regarding the object which is currently selected. Moreover, this information must be available regardless of what type of object is selected (e.g., regardless of whether it is an audio object, a video object, an audio-visual object, etc.). In the preferred embodiment, each of the selectable SPO's is associated with a software application. For example, a voicemail message will be associated with voicemail software, an e-mail message will be associated with e-mail software, etc. Each software application stores (or has access to) information regarding each selectable SPO that is associated with that application. Preferably, the application stores information regarding the location or identity of the SPO (such as a file name, a voicemail message number, or the like), the length of the SPO, the most recent status (playback, record, stopped, etc.), and the current position of the SPO. Whenever a particular SPO is selected, the application will pass this information to the tool bar software, i.e., the software which responds to the selection of a tool from the tool bar 416. Although it is conceivable that, rather than passing information, the information could be stored in a common location which could be accessed by both the application software and the tool bar software, the passing of information is believed to provide the most efficient use of resources.

After the information has passed to the tool bar software, this information is used by the tool bar software to respond to a selection of a tool and to control playback, e.g., by sending a command to, for example, initiate playback beginning with the current position.

When the user deselects a SPO (which can be done manually, and preferably happens automatically upon the user selecting a new SPO), the application associated with the deselected SPO will retrieve the relevant information from the tool bar software, such as the current position and status and will store this information. The application will also stop or suspend the execution of any playback or recording of the deselected SPO which may be in progress.

In one embodiment, the information regarding each SPO (such as the name, length and current position) is stored in memory 208. It would also be possible to store the information in non-volatile media such as a hard disk. In one embodiment, the relevant information for all SPO's is stored in a server volatile memory or in non-volatile memory, e.g., in a database system, whenever the user logs off. In the embodiment depicted in FIG. 3, the information may be stored in a network server 322 hard disk. In one embodiment, the information which is stored in the database includes the identity, length and status (opened/unopened) of the message but does not include storage of the current position, so that, upon logging on a second time, all SPO's are positioned in the initial position.

If desired, the system can be configured such that when the user selects an SPO, a window is opened (i.e., displayed) relating to that SPO. However, according to the present invention, it is not necessary to provide a separate tool bar 416 for each selected SPO or for each opened SPO window. When two or more windows are open, the user can select between SPOs by selecting windows in a manner well known for a windows-compatible program.

Figure 1:
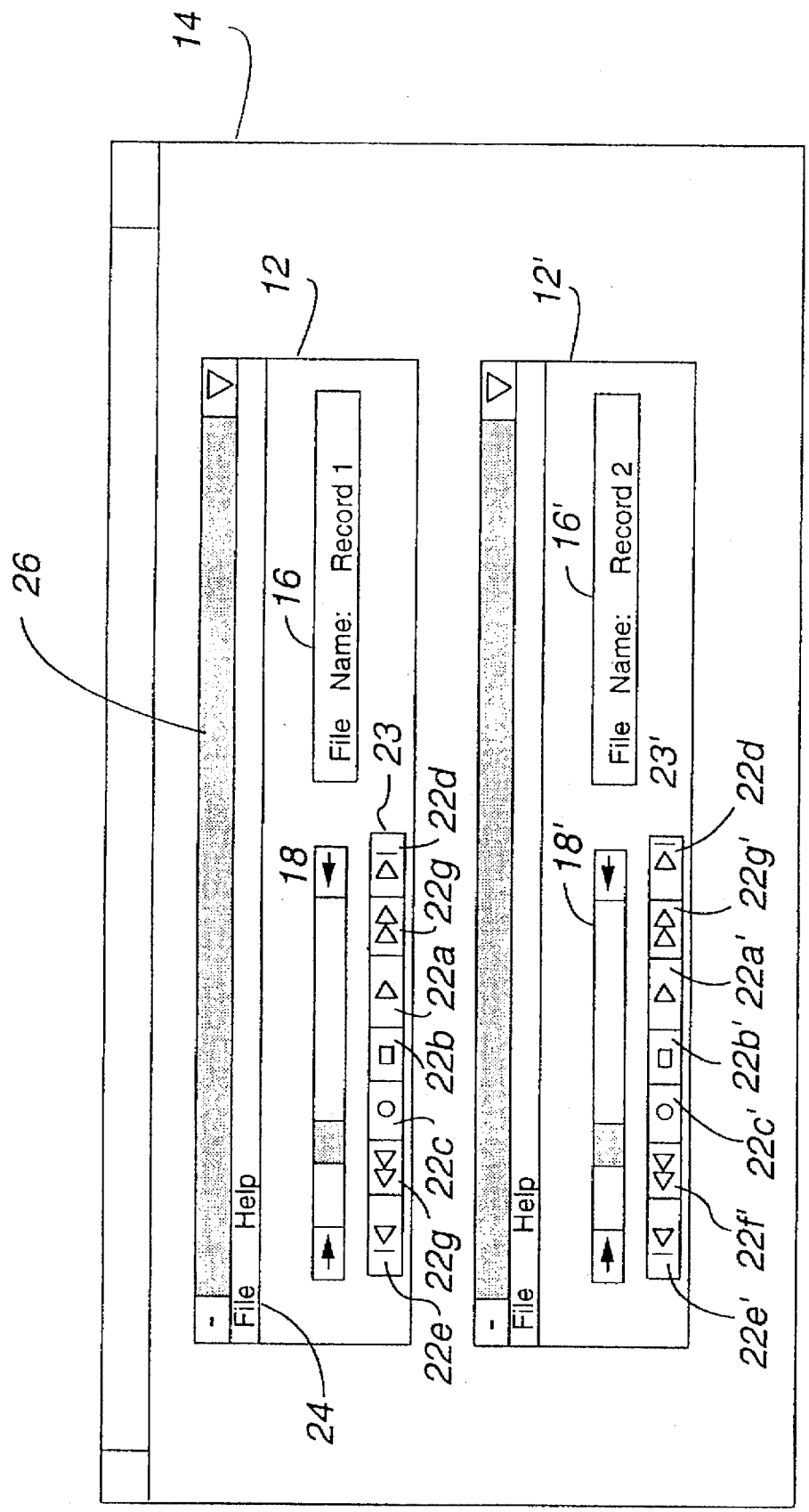
FIG. 1 depicts the appearance of a computer video display according to previous devices and methods.

In one embodiment, it is permissible for a user to select several objects so that two or more objects can be simultaneously in a selected state. For example, in one embodiment if a user uses a mouse to point to and "click" on an object 502, that object will be selected and any previous objects will be deselected. However, if the user holds down the "shift" key on the computer keyboard, uses the mouse to point and click on a first object 502 and then, while still holding down the shift key, uses the mouse to point to and click on a second object 504, both objects will be simultaneously in the selected state. In previous devices when each selected objected had its own tool bar, as shown in FIG. 1, simultaneous selection of objects was handled by having each tool bar operate on its corresponding object. However, if there is only a single tool bar, simultaneous selection of objects must be handled in a different manner. Several options are available. In one option, simultaneous selection of two or more objects causes the tool bar 416 to be disabled (indicated, for example, by the tool bar display as depicted in FIG. 4). In another embodiment, simultaneous selection causes the tool bar to operate on a concatenated object, i.e. results in the effective creation of a new object which is a concatenation of the selected objects (preferably in the order in which they were selected). The control or tool indicator of the tool bar may change in accordance with the characteristics of the selected SPO. For example, selection of a video object, following a selected audio object may result in the display (or highlighting) of command indicators which apply only to video objects (e.g., hue) and the deletion (or greying) of command indicators which relate only to audio objects (such as tone). In this situation, selection of the playback tool 422a can result in playing of each of the concatenated messages sequentially (i.e. requiring another activation of the playback tool 422a between playback of each of the concatenated messages) or continuously (such that all messages are played one after the other, in response to a single selection of the playback tool 422a). This option, for example, could be used to, e.g., forward a plurality of messages as if it were a single message, or could be used to play back all messages (or, for example, all not yet opened messages) in a hands-free manner. The system can also be configured to simultaneously select a plurality of objects (e.g., all unopened objects) automatically (without requiring the user to click on each selected object). An example will serve to illustrate one of the useful features of the invention. In this example it is assumed that the first SPO 504 is a voicemail message, sent to a user, which contains five questions to which the sender wishes a response. The user will select the first voicemail message 502 and then select the playback tool 422a which will initiate playback of the message. Once the user has listened to the first of the five questions, the user will select the "reply" tool 505 which opens, and simultaneously, selects a new SPO 506. The act of selecting SPO 506 automatically suspends the playback of the first SPO 502. Thus, with a single tool selection 506, the user is able to suspend playback, after having heard the first question, and open a new SPO which is ready to record the user's answer to the first question. The user then selects the record tool 422c and begins recording a voicemail message responding to the first question. When the user has finished recording the response to the first question, the user then selects the first message 502 (e.g., by using the mouse or other pointer to move the cursor over the message indicator 502 and clicking a button). The first message 502 automatically begins playback beginning where the previous playback of the message and thus plays back the second question. The user, after hearing the second question, selects the SPO 506 and the SPO 506 automatically commences recording (beginning where it left-off, i.e., after the end of the recorded response to the first questions) so that the user can then record a response to the second question. The user thus continues toggling between selections of the first SPO 502 and the second SPO 506 in order to, listen to each question in order and record a response, with a minimum of commands. After the user has listened to the last of the message 502 and has recorded the last of his response 506, the user can select the stop tool 422b to stop the recording process and then can, at his leisure, select the send tool 508, e.g., to automatically send a response to the sender of message 502.

In one embodiment, the same tool bar can be used regardless of the hardware which is employed for playing back messages. For example, in some embodiments, the user can select to play back a message either using the speaker of the telephone, or using a speaker connected to, for example, a "sound board" of the PC. Typically, the output which drives the phone playback will be in a format different from the output which would be sent to the sound board. In the preferred embodiment, the tool bar software will automatically attend to configuring the output in format appropriate for the playback hardware that has been selected. A similar conversion is preferably automatically performed by the tool bar software regardless of recording hardware, e.g., regardless of whether a recording is being made using the telephone as the input instrument or a PC sound card and microphone as input. Similarly, the same tool bar 416 can be used regardless of whether the playback is a playback of audio material, video material or audio-visual material with the appropriate change of format being automatically achieved by the tool bar software.

Preferably, the tool bar software receives information regarding the capabilities of the hardware and software which is associated with the particular message. In one embodiment, if the SPO is one which cannot be recorded or recorded-over, the record button 422c will be automatically rendered inoperable (and, preferably indicated as such by, for example, greying or dulling of the record indicator 422c). If, for example, the tool bar 416 includes a volume control, such volume control would be automatically rendered inoperable if the SPO is a purely video object with no "volume" associated with it.

Figure 6A:
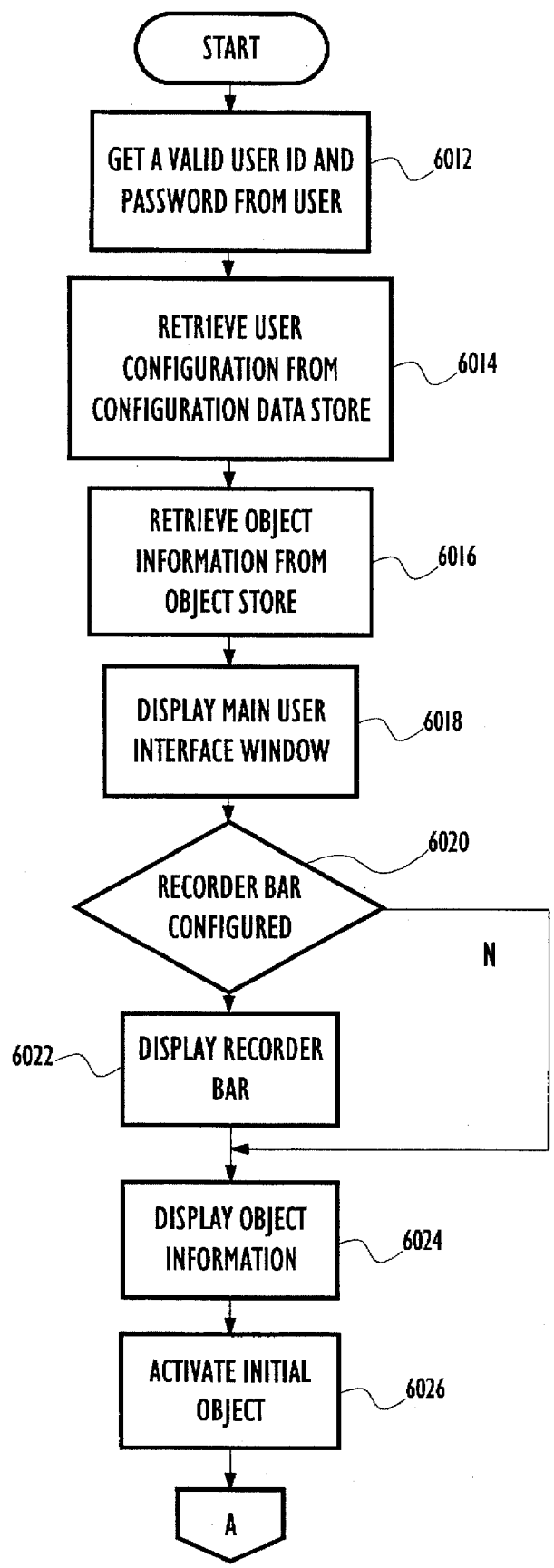
FIGS. 6A–6V are flow charts showing a method for control of a sequential-playback objects, according to one embodiment of the present invention.
Figure 6B:
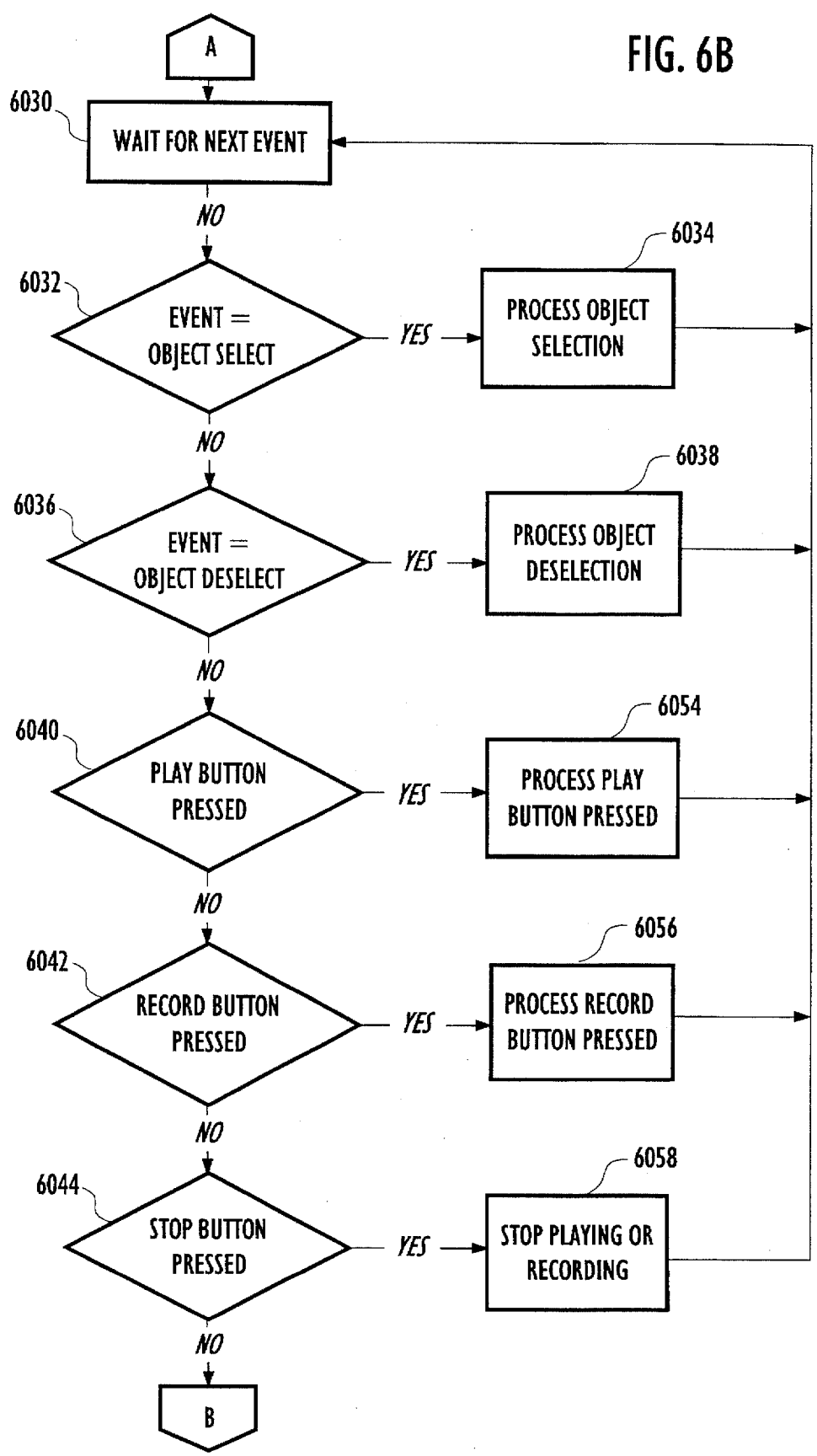
Figure 6C:
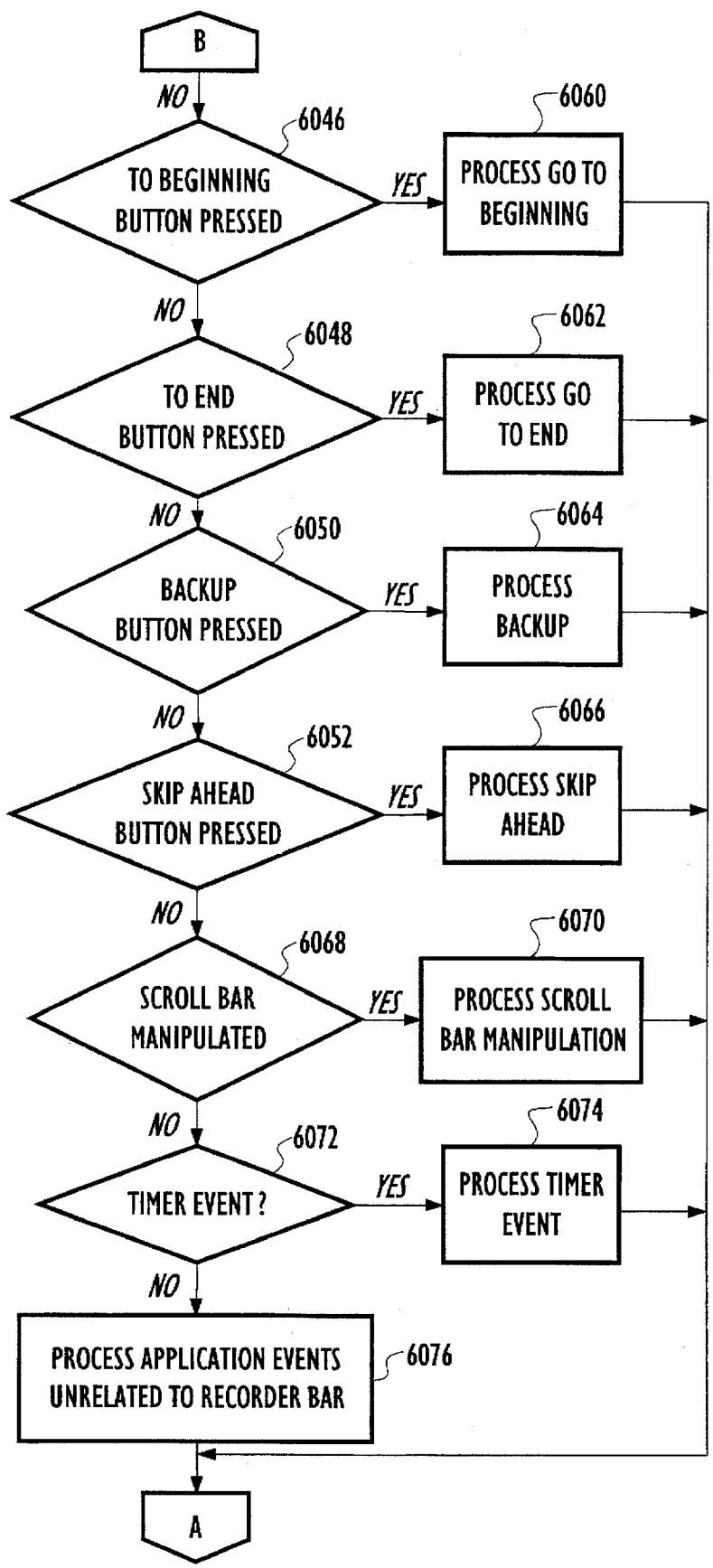

A process for controlling SPOs, according to one object of the invention, is shown in the flow charts of FIGS. 6A–6B. As shown in FIG. 6A, after obtaining user ID and password 6012, the user configuration is retrieved 6014, and object information is retrieved from the object store memory 6016. This can involve, for example, retrieving voice mail messages, e-mail messages, fax messages and the like for the user. The main user interface window 6018 is displayed, such as that depicted in FIGS. 4 and 5. The software then determines whether the recorder bar 416 has been configured 6020. If so, the recorder bar is displayed 6022. The object information 401 is displayed 6024 and one of the objects is automatically selected or activated, such as by activating the initial object in the list 6026. The process then waits for. an event to which the process can further respond 6030. Events to which the process can respond can include selection of an object or selection of a command indicator such as a play button, record button, stop button or the like. If the process detects an object select event 6032 (such as the user clicking on a new object) the object selection procedure 6034 (detailed in FIG. 6D) is processed. If an object de-select event is detected (which, as noted above, preferably can occur automatically upon the selection of a new object) the object deselection procedure (detailed in FIG. 6E) is processed 6038. If one of the command selections such as the play button, record button, return-to-beginning button, move-to-end button, rewind or "backup" button, fast forward or "skip ahead" button is clicked or "pressed" 6040, 6042, 6044, 6046, 6048, 6050, 6052, the corresponding procedures (detailed respectively, in FIGS. 6F–6L) are processed 6054, 6056, 6058, 6060, 6062, 6064, 6066. If the manipulation of a scroll bar 428 is detected 6068, the scroll bar manipulation procedure (detailed in FIG. 6M) is processed 6070. If a timer event is detected 6072, the timer event procedure 6074 (detailed in FIG. 6N) is processed. If none of the events are detected, any events which are unrelated to the recorder bar are processed 6076. The procedures 6032–6076 can be performed in an order other than that depicted. Following any processing of procedures, the procedure returns to the top to await the next event 6030.

Figure 6D:
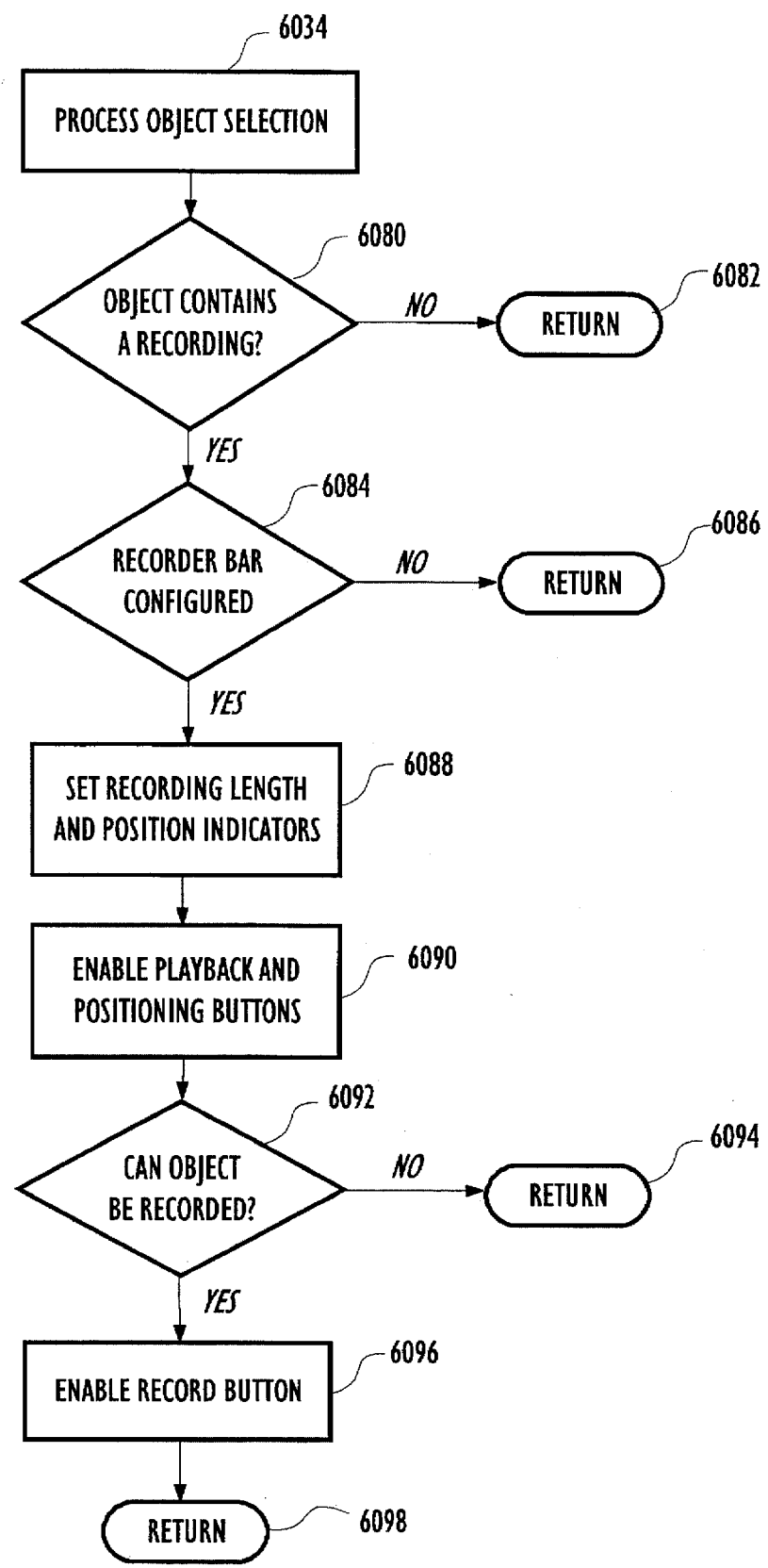

As shown in FIG. 6D, in the object selection procedure, it is determined first whether the object is a recording or is otherwise an SPO versus a non-SPO 6080. If the selected object is not an SPO, the recorder bar will not be appropriate and the procedure returns 6082 to the main procedure FIG. 6D. If the object is an SPO, the recorder bar is configured 6082. Otherwise, the procedure returns to the main routine 6086. In the recorder bar configuration, the information appropriate to the selected object is received (e.g., by being passed from the application software, as described above). This can include information regarding the total length of the SPO and the current position which are then set 6088 in the appropriate indicators 426, 428, 430. The playback and positioning buttons are enabled, i.e., the software is configured so that selection of the playback button or the positioning buttons will result in initiation of a playback routine or a positioning routine and, preferably, this enablement is reflected in the display, e.g., by highlighting the appropriate buttons or indicators 6090. It is next determined whether the SPO is an object which can be recorded 6092. An example of an object which can be recorded is, for example, a new voice message to be sent as a reply to a received voice mail message. An example of an object which cannot be recorded is, for example, an object which has been designated as "read only" or "playback only." In this case, the routine returns to the main program 6094. However, if the object can be recorded then the record indicator or button 422c is enabled 6096 (i.e., the software is configured so that user-selection of the record indicator 422c results in initiation of a recording procedure) and the status of the record button is preferably displayed, such as by highlighting. The object selection procedure then returns to the main grouping 6098.

Figures 6E, 6H:
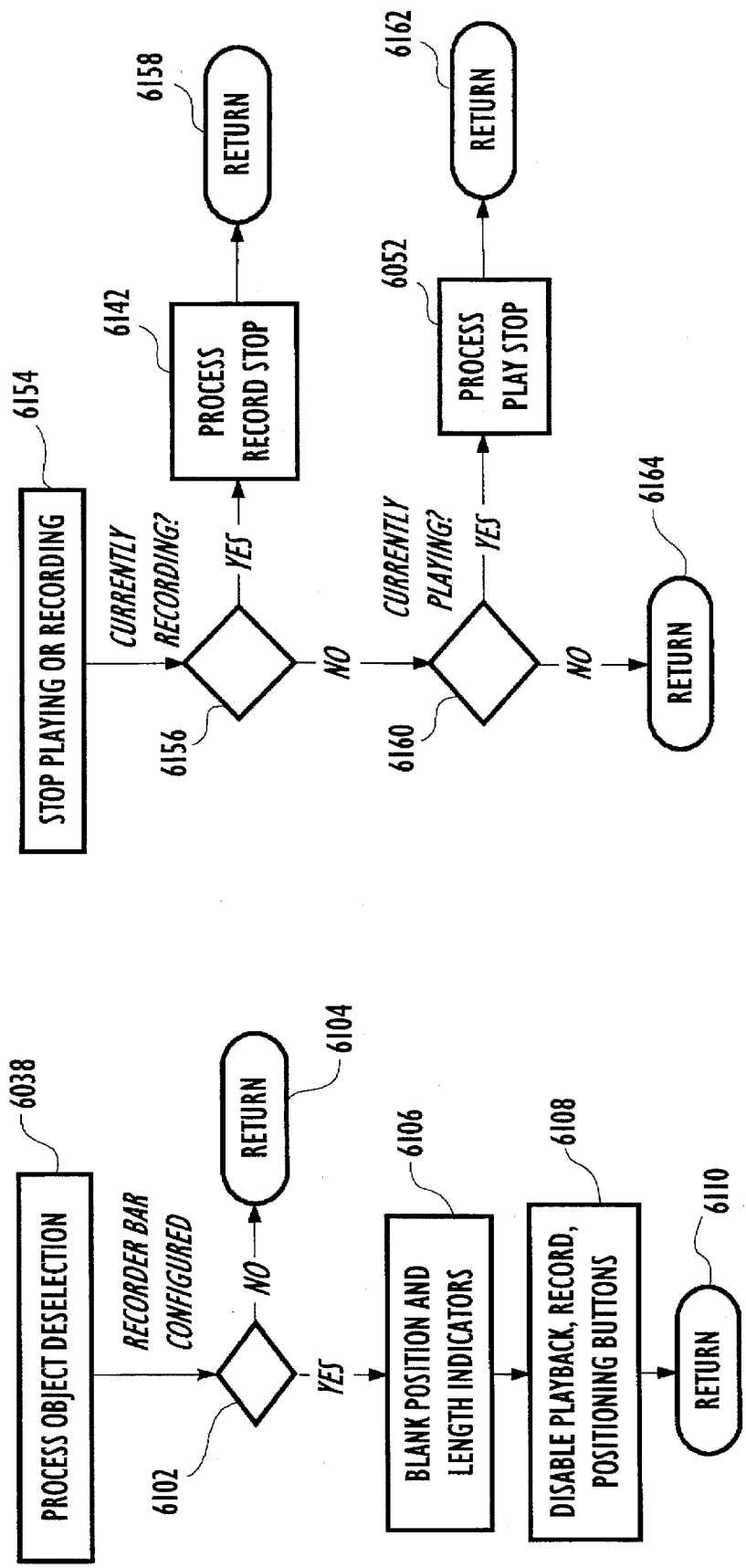

As shown in FIG. 6E, when an object is deselected, it is determined whether the recorder bar is configured 6102. If not, the procedure returns to the main routine 6104. Otherwise, deselection of an object results in the blanking 6106 of the position and length indicators 426, 428, 430 and the disabling of the playback, record and the positioning buttons 6108 before returning to the main routine 6110. In situations where object deselection was the result of selecting a new object, the procedures may be followed, in rapid selection by the procedures selected in FIG. 6D so that the user may not perceive the blanking of the fields and disabling of the buttons before the new indicators and button enablement is displayed for the newly-selected object.

Figure 6F:
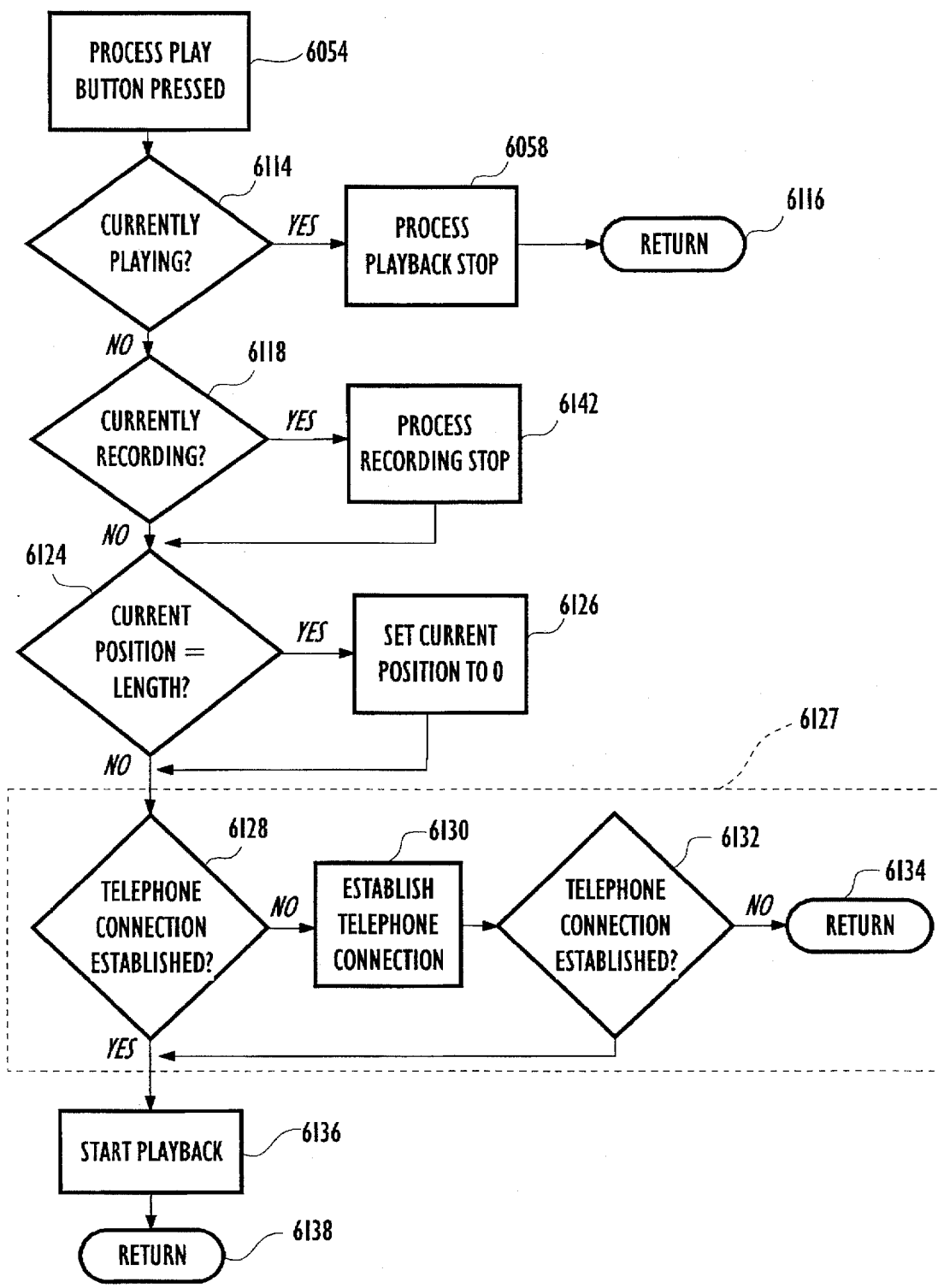

As shown in FIG. 6F, if the play button is processed, it is determined whether the object is currently in the playback mode 6114. In this case, the playback stop procedure is processed 6058 as depicted in FIG. 6V, and the procedure returns to the main routine 6116. If it is determined that the object is currently in a record mode 6118, the recording stop procedure is performed (FIG. 6U). If the current position for the SPO is equal to the total length of the SPO 6124, the current position value is set to zero 6126, effectively returning to the beginning of the SPO. It is next determined whether a telephone connection is established 6128. If not, the connection is established 6130 and the connection verified 6132. Failure to establish the telephone connection results in return to the main procedure 6134. After establishing the telephone connection, the start playback routine is begun as depicted in FIG. 6S. Thereafter, the procedure returns to the main routine 6138.

Figure 6G:
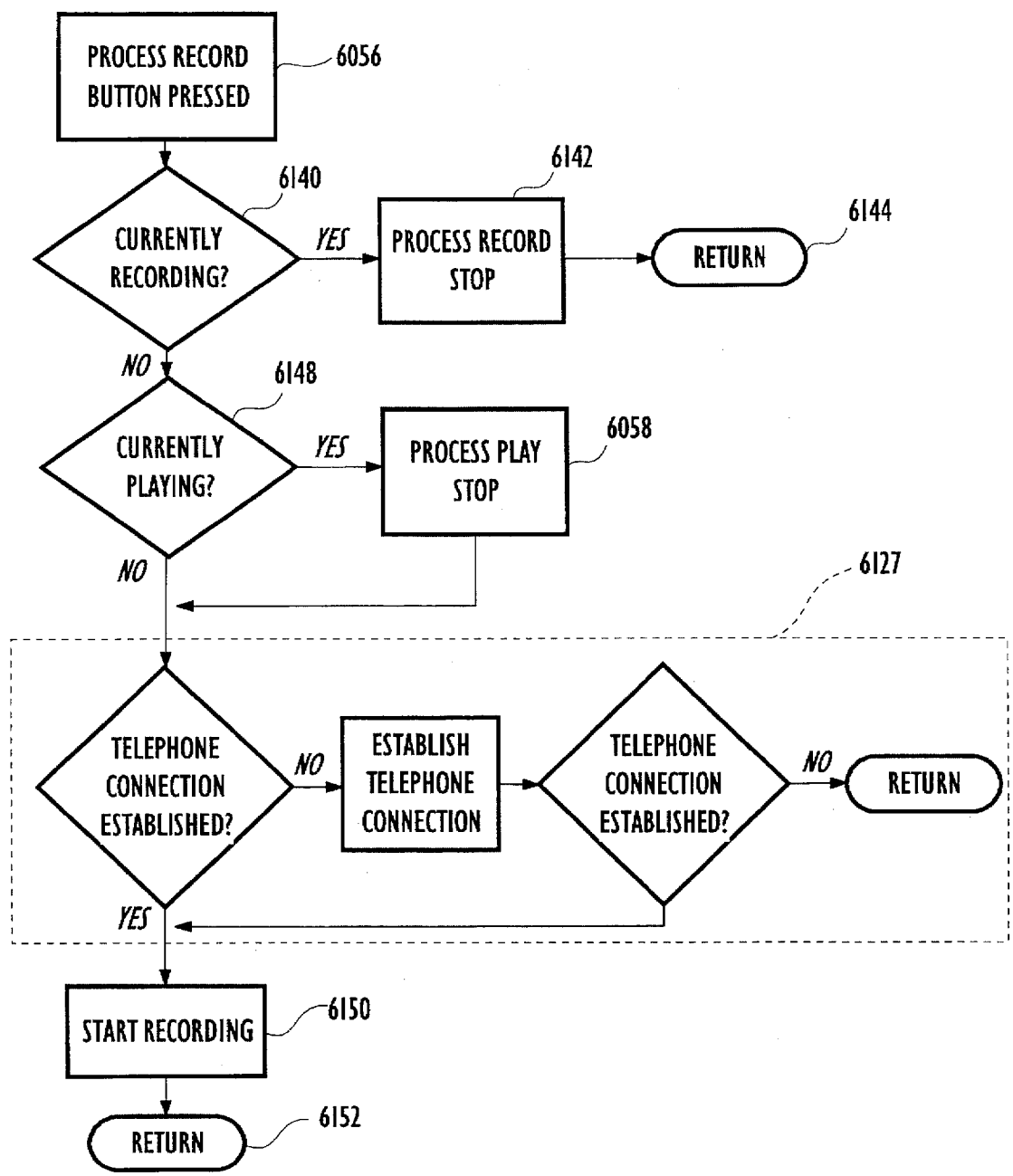

As depicted in FIG. 6G, following the selection of a record indicator, it is determined whether the SPO is currently in the record mode 6140. If so, the record stop routine is processed (FIG. 6V) and control is returned to the main routine. If the SPO is currently playing 6148, the play stop procedure is processed 6058 (FIG. 6V). The telephone connection is established and verified 6127 and the start record procedure is begun 6150 (FIG. 6D) whereupon the procedure returns to the main routine 6152.

As depicted in FIG. 6H, in those cases where it is required to stop playing or recording 6154, it is first determined if the SPO is currently recording 6156 and if so, the record stop procedures 6142 is processed and the program returns to the main routine 6158. If not currently recording, it is determined if the SPO is currently playing 6160 and if so, the play stop procedure 6052 is processed before returning to the main routine 6162. If neither playing nor recording, control returns to the main routine 6164.

Figures 6I, 6J:
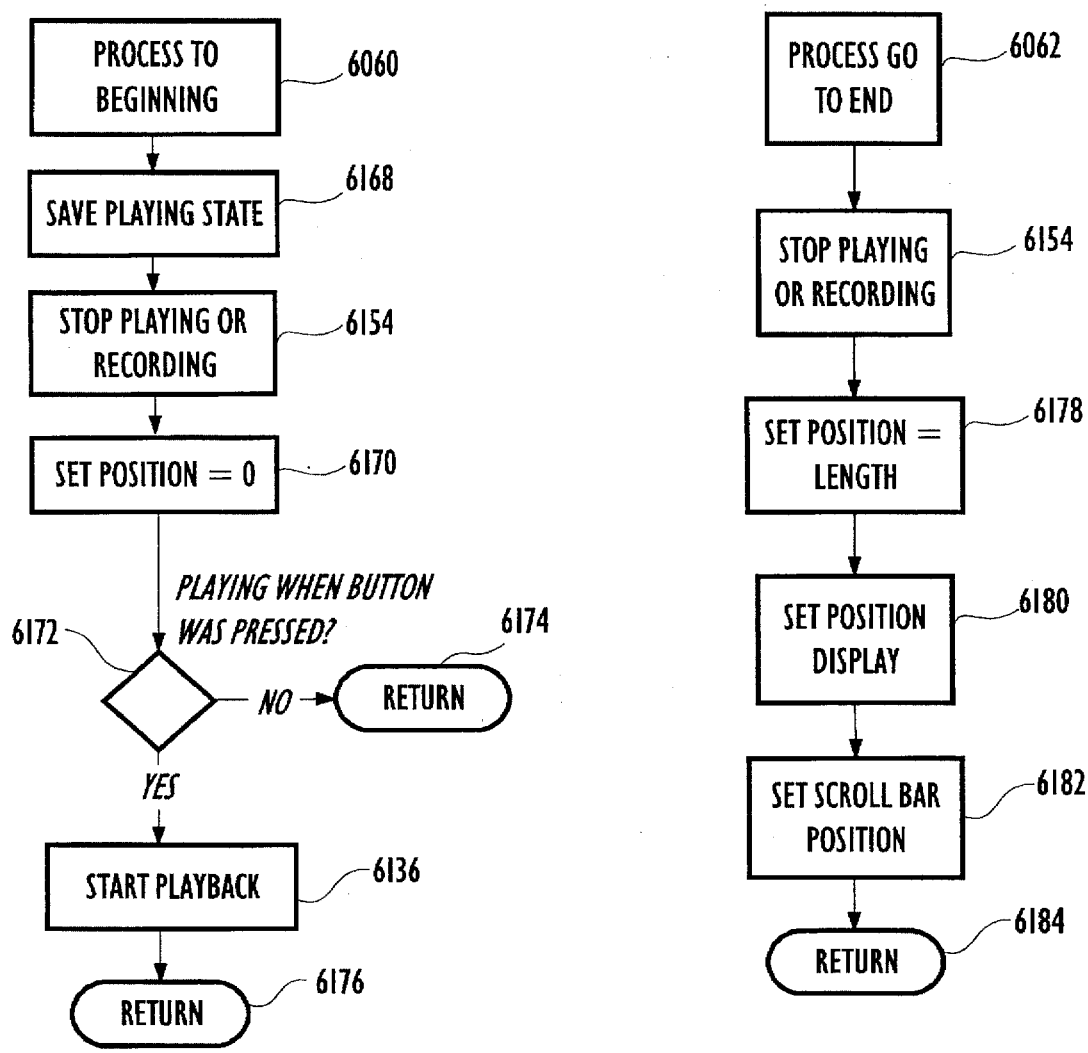

As shown in FIG. 6I, if the return-to-beginning command is selected, the routine first saves the "playing" state 6168. Next, the routine performs the "stop playing or recording" routine 6154 (FIG. 6H) and sets the position or location of the SPO to zero 6170. It is then determined whether the SPO was playing when the "return-to-beginning" indicator was selected 6172. This can be determined from the state which was saved in step 6168. If not, the procedure returns to the main routine 6174. Otherwise, the start playback procedure 6136 (FIG. 6S) is begun. Afterwards, the procedure returns to the main routine 6176.

As depicted in FIG. 6J, if the move-to-end command was selected, the "stop playing or recording" procedure is executed 6154 and the position indicator is set to a number equal to the total length of the message 6178 effectively setting the SPO at the end of the message or object. The position display 428, 426 is reset accordingly 6180 and the position scroll bar 428 is reset accordingly 6182 whereupon the procedure returns to the main routine 6184.

Figure 6K:
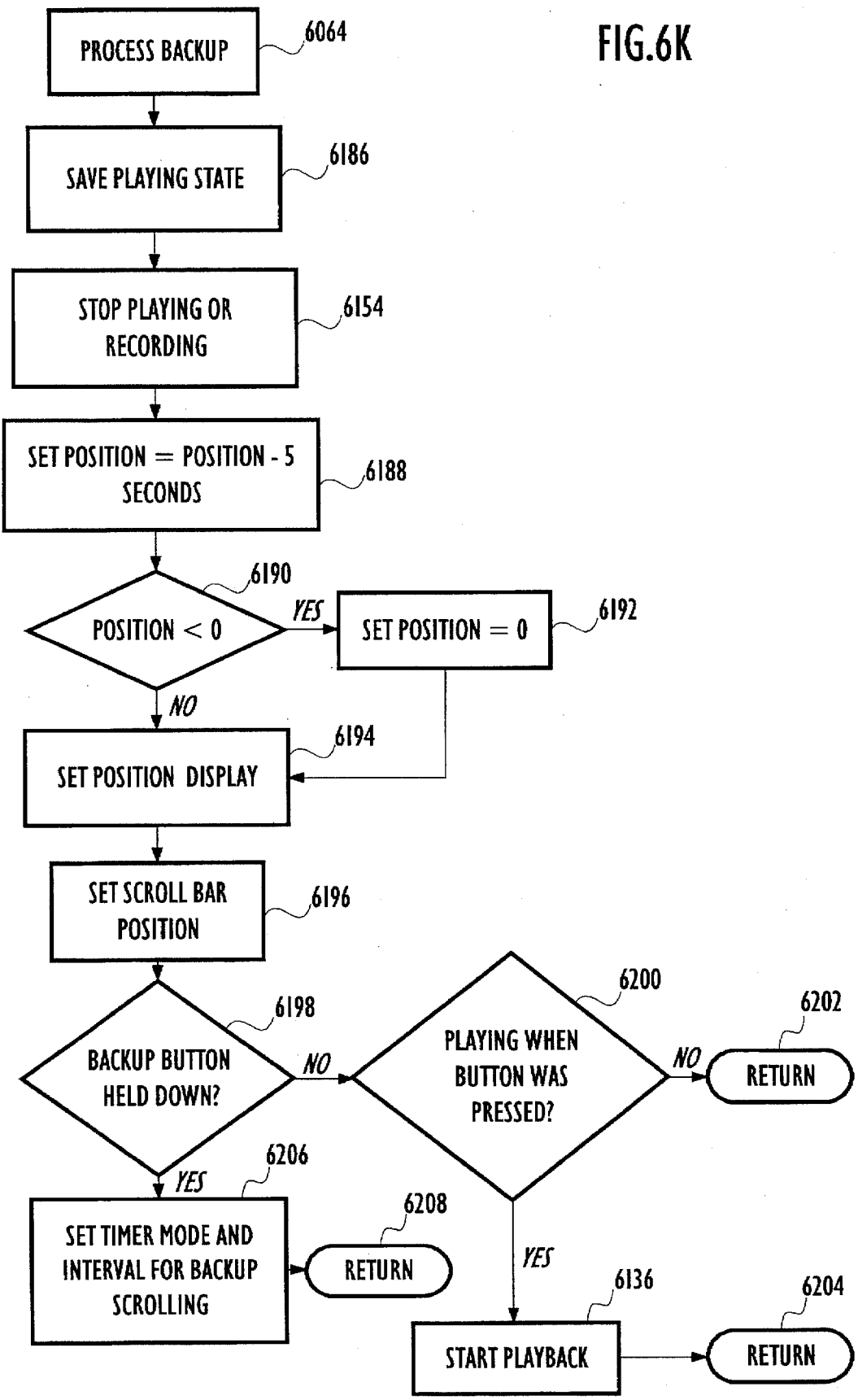
Figure 6L:
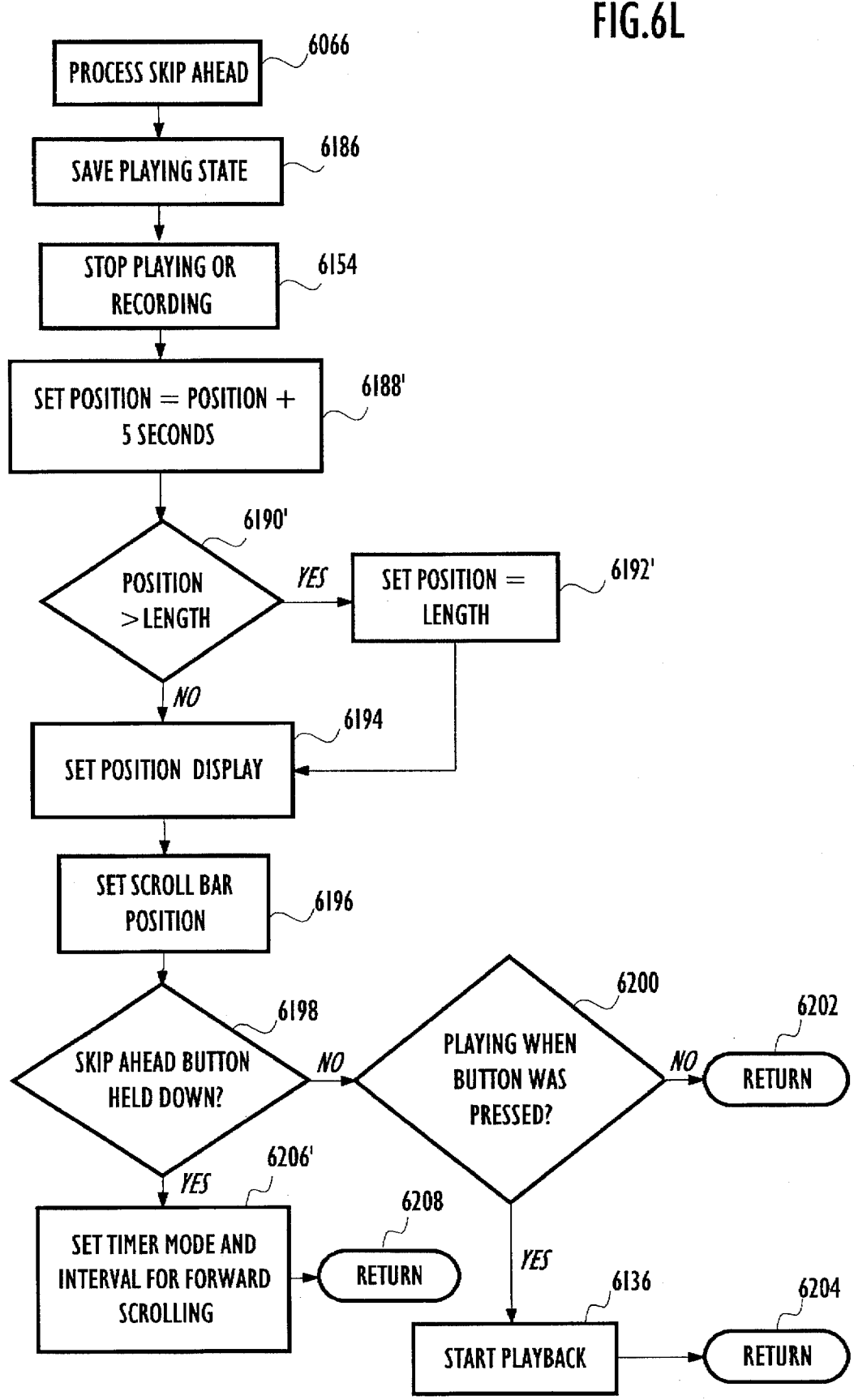

As depicted in FIG. 6K, if a rewind or backup command is selected, the routine first saves an indication of whether the SPO was in the "play" state 6186. The "stop playing or recording" procedure is performed 6154 and the position is decremented a predetermined amount. In the depicted embodiment, it is decremented by an amount equal to a playback five seconds 6188. If this decrementing results in the position being a negative number 6190, the position indicator is set to zero 6192. Next, the position display 426 is updated 6194 and the position scroll bar 428 is updated 6196. The routine then determines whether the backup button is being "held down" 6198. In one embodiment, the button is "held-down" if the user has used the mouse to position the cursor over the backup or rewind indicator or button 422f and pushed the mouse button down but not released the mouse button. If the backup button is not being held down, it is determined whether the SPO is playing when the backup button was pressed 6200 (e.g., by reference to the state which was saved in step 6186). If not, the procedure returns to the main routine 6202. If the SPO was playing then playback is started 6136 (FIG. 6S) so that, in this situation, the effect of selecting the rewind button is to begin playback from a position five seconds earlier then the previous "current" location. Thereupon, the procedure returns to the main routine 6204. If it was determined that the backup button was being held down, a timer mode indicating backup scrolling is set and an interval for backup scrolling is set, e.g., to a default value 6206, whereupon the procedure returns to the main routine 6208.

The procedure in response to a selection of a skip ahead button 6066 (depicted in FIG. 6L) is similar to that described in connection with FIG. 6K, except that the new position is incremented 6188', rather than decremented, the position is checked against the length 6190' and is given a maximum value equal to the length 6192' and the timer mode and interval are set for forward scrolling 6206' rather than reverse scrolling.

Figure 6M:
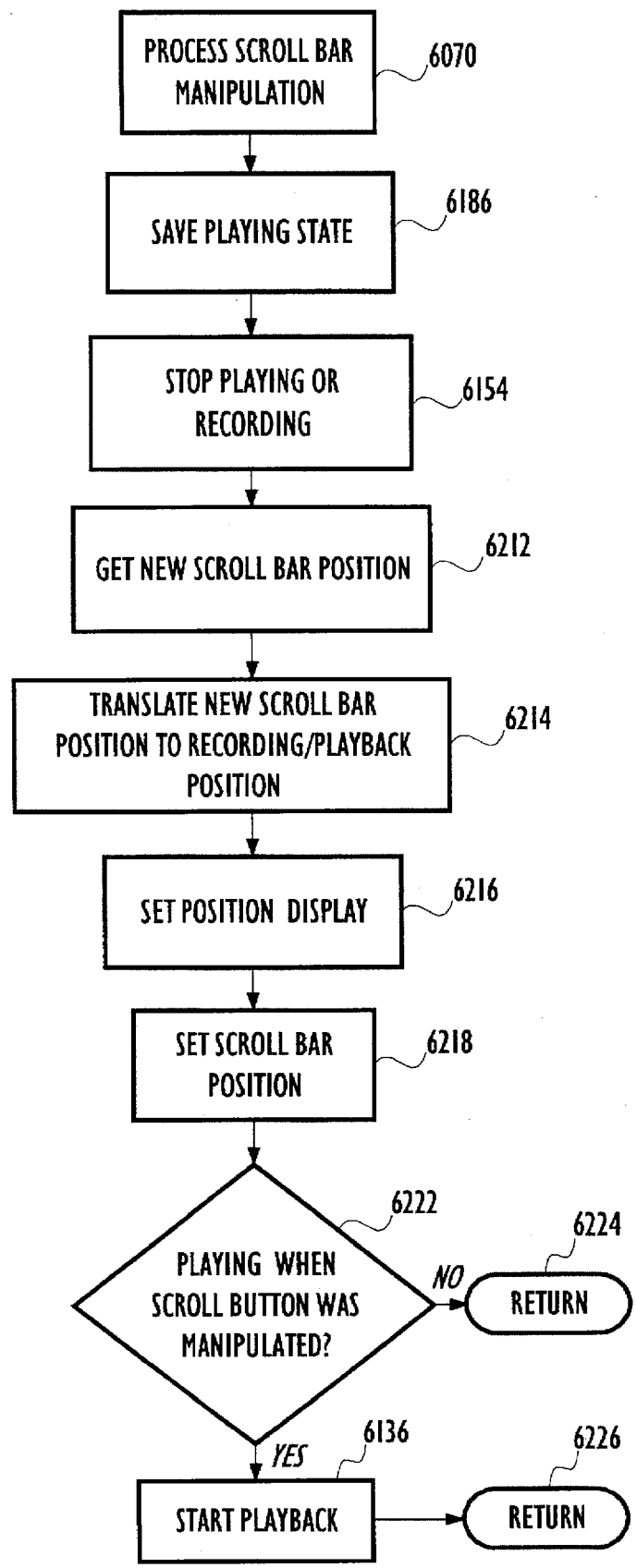

As depicted in FIG. 6M, in response to a manipulation of the position scroll bar 428, the playing state is saved 6186 and the stop playing or recording procedure 6154 is performed. The procedure obtains information about the new scroll bar position 6212. For example, if the user has used the mouse to "drag" the position indicator to a new position in the scroll bar, this new position is determined. The new scroll bar position is then translated into a recording position 6214. For example, the recording/playback position can be calculated as the length of a message times a factor equal to the distance of the position marker 429 from the left-hand edge of the scroll bar 428 divided by the horizontal extent of the scroll bar 428. The position display 426 is then reset accordingly 6216 and the scroll bar position 428 is updated 6218. If the SPO was playing when the scroll manipulation occurred 6222, playback is started 6136 and the procedure returns to the main routine 6224, 6226.

Figure 6N:
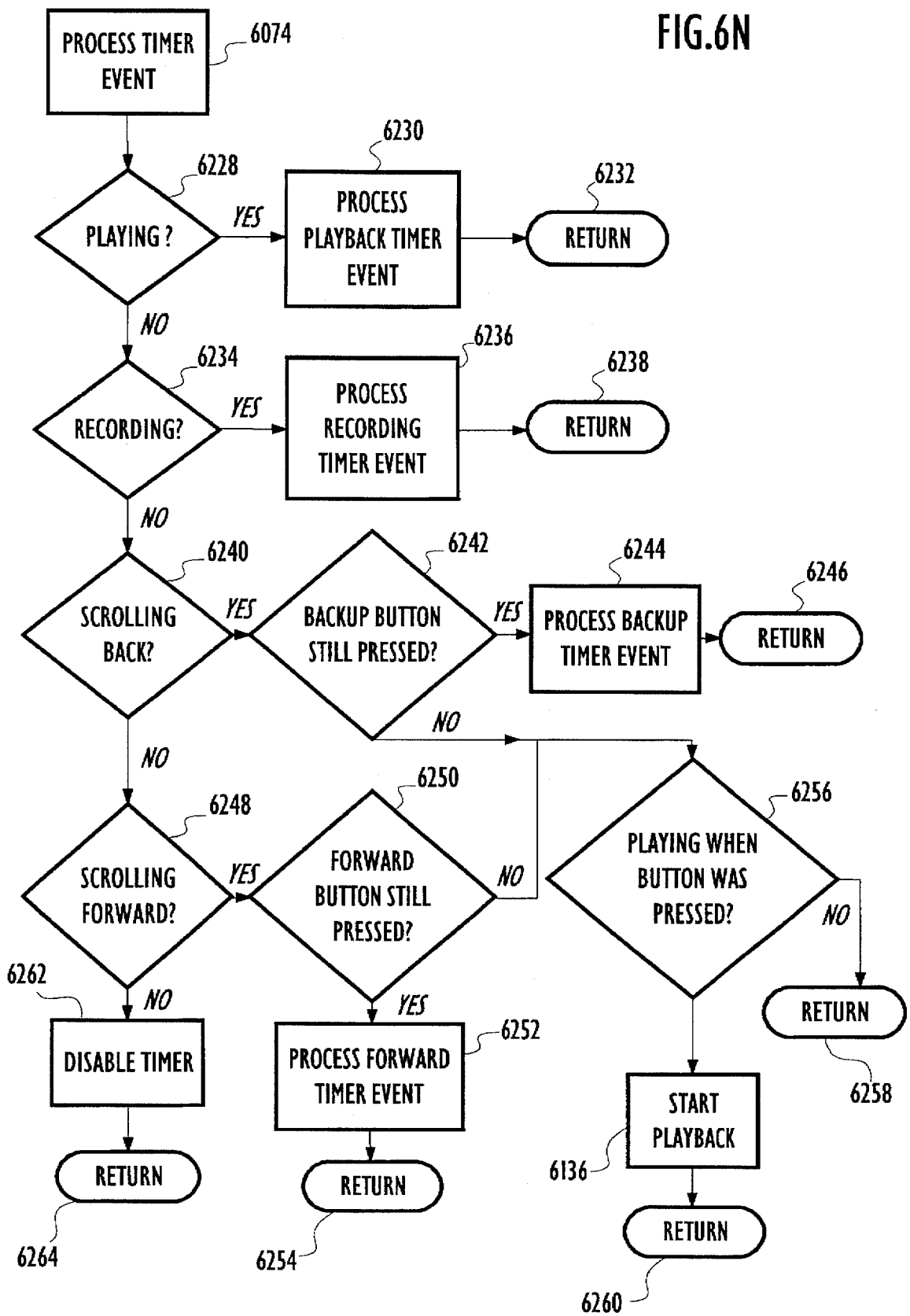
Figure 6P:
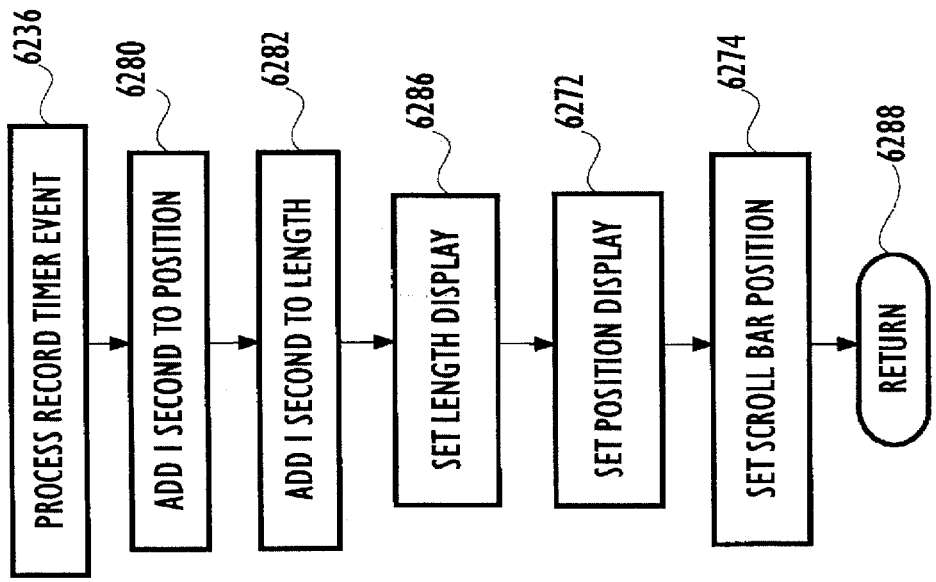

If a timer event is detected 6074, the procedure depicted in FIG. 6N is followed. The timer event can be used for a plurality of purposes. The procedure of FIG. 6N depicts using the timer event to assure that the screen indicators which show the location 426, 428 accurately reflect the location in the event of a record, playback, fast forward or rewind event. If it is determined that the SPO is currently playing 6228, the playback timer event 6230 (FIG. 6O) is performed and the procedures returns to the main routine 6232. If it is determined that the SPO is recording 6234, the recording timer event is processed 6236 (FIG. 6P) and thereafter, control returns to the main routine 6238. If the SPO is rewinding or scrolling backwards 6240, it is determined whether the backup button is still being pressed or indicated or "held down" 6242 in which case, the backup timer event is processed 6244 (FIG. 6Q) whereupon control returns to the calling program 6246. If the SPO is fast forwarding or scrolling forward 6248, it is determined whether the fast forward button is still pressed or "held down" 6250. If so, the forward timer event procedure 6252 is processed (FIG. 6R) and control returns to the calling program 6254. If the backup button or fast forward button is not being pressed, it is determined whether the SPO was playing when the rewind or fast forward button was pressed or selected 6256. If not, control returns to the calling program 6258. If so, the playback routine is started 6136 and thereafter control returns to the calling program 6260. If the SPO was not playing, recording, scrolling back or scrolling forward, the timer is disabled 6262 and control returns to the calling program 6264.

Figure 6O:
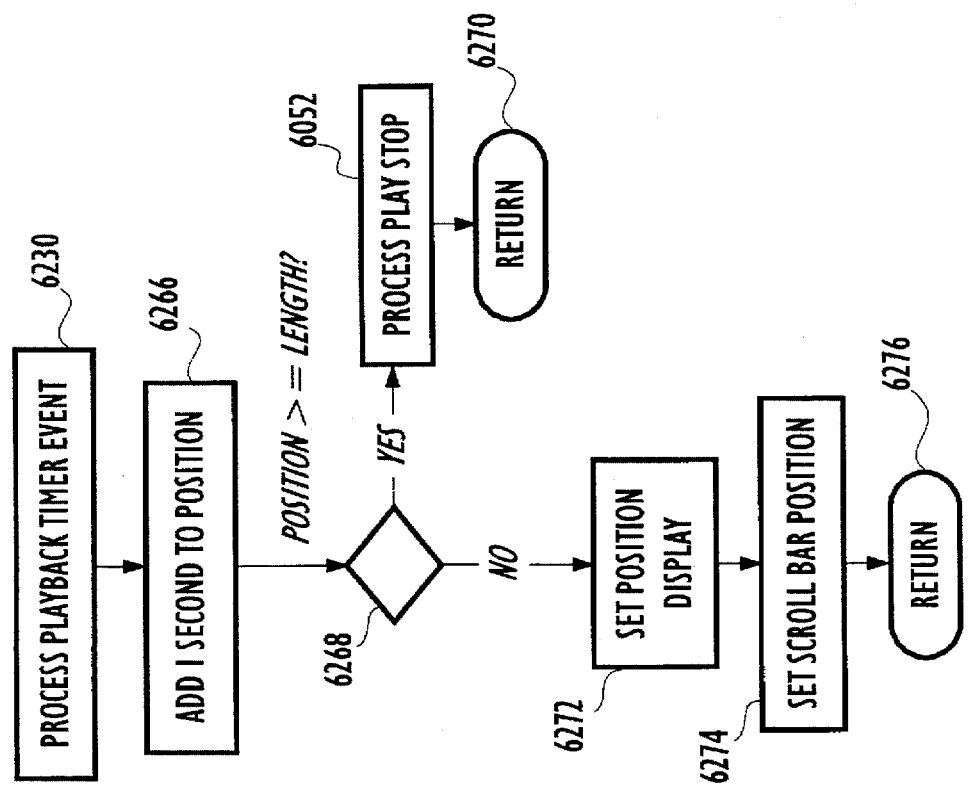
Figure 6R:
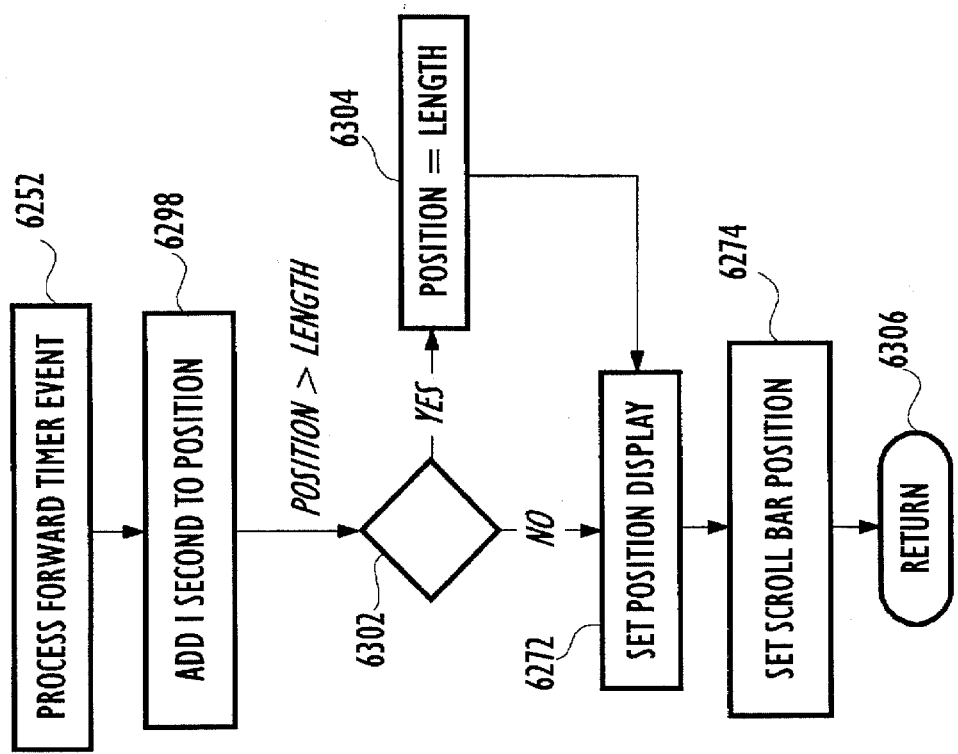

As depicted in FIG. 6O, during a playback timer event process, a predetermined amount (such as one second) is added to the current "position" stored for the SPO 6266. If this causes the position to exceed the length of the message 6268, the stop procedure is performed 6052 (FIG. 6V) and control returns to the calling program 6270. Otherwise, the position and scroll bar displays are updated 6272, 6274 and control returns to the calling program 6276.

As depicted in FIG. 6P, in the event of a record timer event, a predetermined amount (such as one second) is added to both the position indicator 6280, 6282 and the procedure updates the length display 6286 as well as the position and scroll bar displays 6272, 6274 before returning to the calling program 6288.

Figure 6Q:
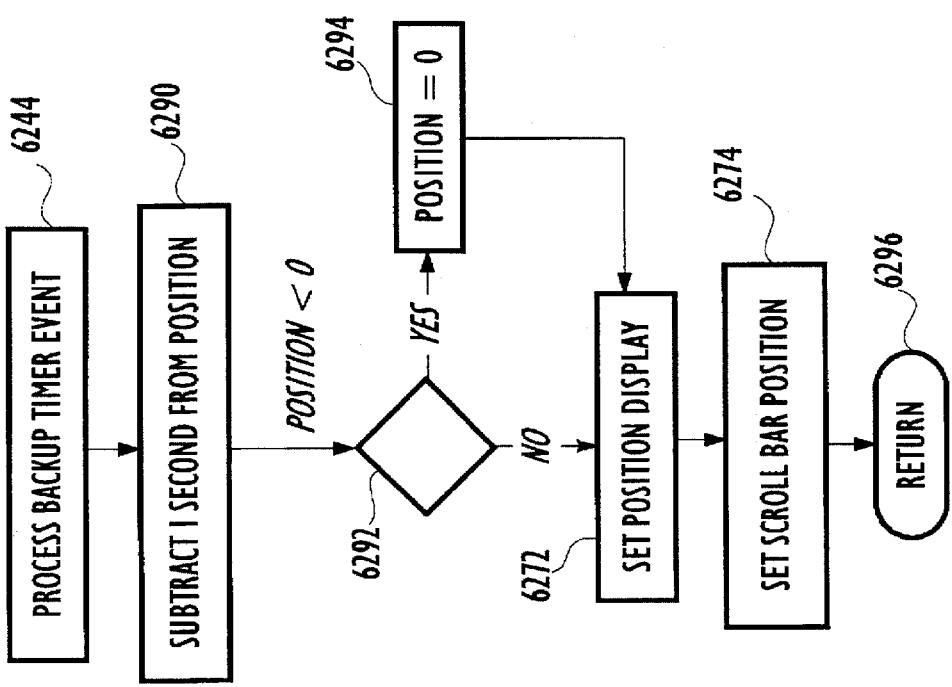
Figure 6S:
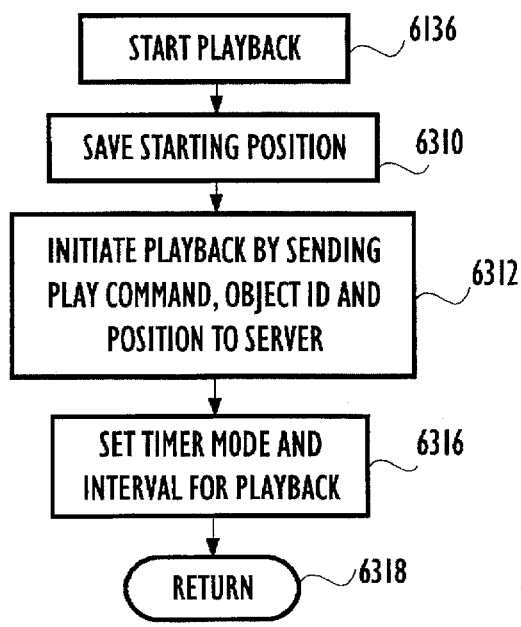

As depicted in FIG. 6Q, for a backup timer event, a predetermined amount (such as one second) is subtracted from the position 6290. If this causes the position to be negative 6292, the position is set equal to zero 6294. The display and scroll bar are updated 6272, 6274 before returning to the calling program 6296.

As depicted in FIG. 6R, for a forward timer event, a predetermined amount (such as one second) is added to the position indicated by the SPO 6298. If this causes the position to exceed the length since the position is set equal to the length 6304. The display and scroll bar indications are updated 6272, 6274 before returning control to the calling program 6306.

As depicted in FIG. 6S, a start playback routine begins by saving a starting position 6310. Playback is then initiated by sending a play command, an identifier of the object to be played and the starting position to the device responsible for playing back the item which can be, for example, a voice mail program in the phone server, e-mail software and the like. In some situations other information may be sent in connection with initiating playback, such as information about the speed of playback, type of playback (audio only, video only) and the like. The timer mode and interval for the playback is set 6314 before returning to the calling program 6318.

Figure 6T:
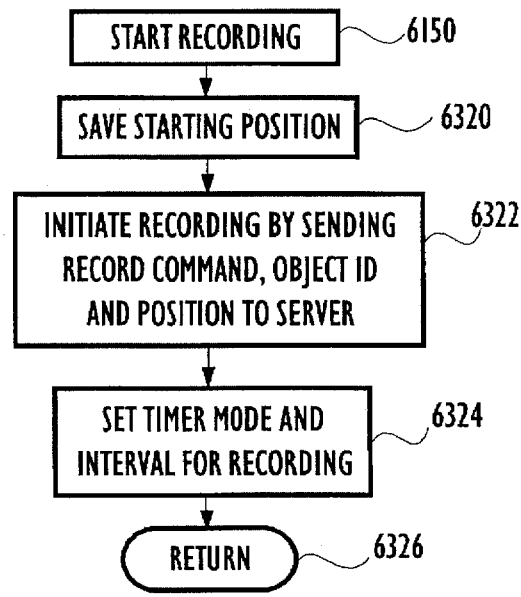
Figure 6U:
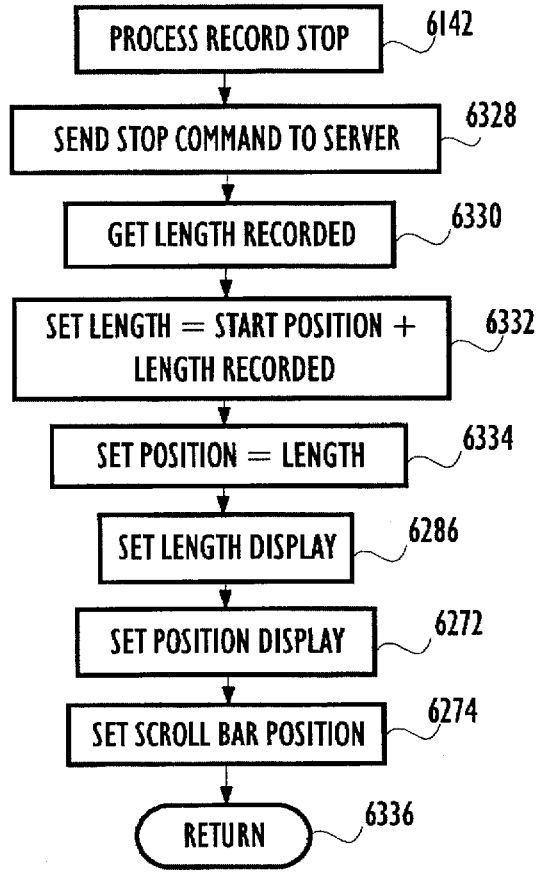
Figure 6V:
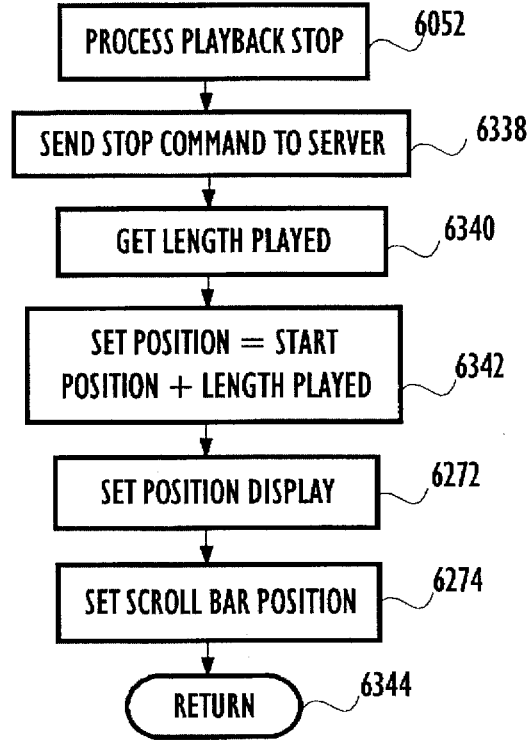

As depicted in FIG. 6T, when a recording is started, the starting position is first saved 6320 and recording is initiated by sending the record command along with other information such as the identification of the object and the position in the object to start recording, to the device responsible for performing the recording, such as a voice mail server and other object software 6322. The timer mode and interval for the recording are set 6324 before returning control to the calling program 6326.

As depicted in FIG. 6U, in response to a record stop command, the stop command is sent to the voice mail server or other device or software responsible for the recording process 6328. The length of the segment which was recorded is obtained (such as by a message sent from the server 6330) and a new length is set equal to the start position for recording plus the length recorded 6332. The position of the SPO is set equal to the length 6334 (so that the SPO is currently positioned at the end of the recording). The procedure then updates the length display, position display and scroll bar indicator 6286, 6274, 6272 before control returns to the calling program 6336.

As depicted in FIG. 6V, in response to a playback stop command, the procedure outputs a stop command to the server or other device which is responsible for the playback 6338. The length which was played is determined (e.g., by being sent from the application software responsible for the playback 6340). The position is set equal to the start position plus the playback length 6342 and the position display and scroll bar displays are updated 6272, 6274 before returning to the calling routine 6344.

In light of the above description, a number of advantages to the present invention can be seen. The present invention provides the ability to control the playback, recording, positioning and adjustment of a plurality of SPOs in a fashion that reduces screen clutter, and is believed to provide rapid execution of commands and reduction in the requirements for computer resources. A single tool bar can be used for controlling any of a plurality of SPOs. The tool bar software will automatically adjust to the characteristic of each particular SPO such as capabilities of associated hardware and software, characteristics of the object such as data storage format, audio/video/audio-visual nature of the SPO and the like. Selection of a new SPO will automatically stop or suspend commands currently being executed on a previously-selected SPO. The user can efficiently and rapidly switch between SPOs, merely by selecting an SPO, with the capability of picking up where previously left-off, both in terms of location in the SPO and, preferably status of the commands.

A number of variations and modifications of the present invention can be used. Although the present invention was described in connection with a PC running under window software, the present invention can be used in many other computing contexts such as mainframe computers, laptop computers, notebook computers, personal communication devices, palm top computers, Apple/Macintosh computers, Unix-based computers, and the like. Although the examples above primarily are related to audio messages such as voicemail messages, other types of SPOs can be handled by the present invention, including video objects, virtual reality objects, multimedia objects, process control, simulations and other sequential objects. Although the present invention as been described by way of a preferred embodiment and certain variations and modifications, other variations and modifications can also be used, the invention being defined by the following claims.

What is claimed is:

1. A method for using a computer for centralized control of a plurality of sequential-playback objects, the computer including a memory having a plurality of memory storage locations, a display device and a user-controllable selection device, comprising:

displaying, on said display device, a plurality of object identifiers which identify stored digital objects, including at least first and second object identifiers which identify first and second sequential-playback objects;

selecting said first object identifier, using said user-controllable selection device;

displaying a plurality of control identifiers, including at least a playback control identifier; selecting said playback control identifier;

initiating sequential playback of said first sequential-playback object in response to said selecting of said playback control identifier;

deselecting said first object identifier and automatically storing, at a first memory storage location in said memory, an indication of a position based on a current position within said first sequential playback object;

selecting said playback control identifier;

initiating sequential playback of said second sequential-playback object in response to said selecting of said playback control identifier; and terminating said sequential playback of said second sequential-playback object and automatically storing, at a second memory storage location in said memory, an indication of a position based on a current position within said second sequential-playback object.

2. A method, as claimed in claim 1, wherein said step of displaying a plurality of control identifiers includes displaying a toolbar comprising a plurality of control identifiers located adjacent one another.

3. A method, as claimed in claim 1 wherein said plurality of control identifiers includes a stop control identifier, a record control identifier, a rewind control identifier and a fast-forward control identifier.

4. A method, as claimed in claim 1, wherein selection of an object is indicated by a visual display on said display device, to visually distinguish a selected object from a non-selected object.

5. A method, as claimed in claim 1, further comprising suspending said sequential playback of said first sequential-playback object in response to said selecting of said second object identifier.

6. A method, as claimed in claim 1, further comprising storing, in a memory, a first value providing an indication of the sequential location, in said first sequential playback object, which had been reached during said sequential playback of said first sequential-playback object, at the time of said selecting of said second object identifier.

7. A method, as claimed in claim 6, further comprising selecting said first object identifier, following said step of selecting said second object identifier and beginning playback of said first sequential-playback object, starting at the sequential location indicated by said first value.

8. A method, as claimed in claim 1, wherein said step of displaying a plurality of object identifiers includes displaying a list of object identifier names and wherein said step of selecting said first object identifier includes pointing to said first object identifier with a pointer device.

9. A method, as claimed in claim 8, wherein said step of pointing includes controlling the position of a cursor, displayed on said display device, using a mouse.

10. A method, as claimed in claim 8, wherein said step of pointing includes pointing to said first object using a stylus.

11. A method, as claimed in claim 8, wherein said step of pointing includes pointing to said first object using a finger.

12. A method, as claimed in claim 1, wherein each of said sequential-playback objects has a plurality of characteristics, including hardware to be used during playback and software associated with said sequential-playback objects, and wherein at least said first and second sequential-playback objects differ in at least one of said characteristics.

13. A method, as claimed in claim 12, wherein said first sequential playback object is played back using an audio output device and said second playback object is played back using a video playback device.

14. A method, as claimed in claim 13, wherein said first sequential playback object is associated with voice-mail software and wherein said second sequential playback object is associated with e-mail software.

15. A method, as claimed in claim 1, wherein at least a third object identifier identifies a non-sequential-playback object, and wherein at least some of said plurality of control identifiers are rendered non-selectable in response to selection of said third object.

16. A method, as claimed in claim 15, further comprising providing a visual indication, on said display, of the non-selectable state of said control identifiers.

17. A method, as claimed in claim 1, further comprising placing said computer in an exclusive-selection mode wherein selection of one of said plurality of object identifiers automatically de-selects any previously-selected object identifiers.

18. A method, as claimed in claim 1, further comprising placing said computer in a non-exclusive-selection mode wherein selection of one of said plurality of objects identifiers does not automatically de-select previously-selected object identifier, to permit concurrent selection of at least two object identifiers.

19. A method, as claimed in claim 18, further comprising rendering at least one of said plurality of control identifiers non-selectable in response to said concurrent selection.

20. A method, as claimed in claim 18, further comprising concatenating the objects identified by said at least two object identifiers, in response to said concurrent selection.

21. A method for using a computer for centralized control of a plurality of stored voice-mail messages, the computer including a memory having a plurality of memory storage locations, a video display and a pointer device for selecting indicators which are displayed on the display, the method comprising:

displaying, on said video display, a list of identifiers of stored voice-mail messages;

selecting a first voice-mail message using said pointer device;

displaying, on said video display, a first toolbar image, having a plurality of tool indicators, including a playback indicator, a stop indicator, a record indicator, a rewind indicator and a fast-forward indicator;

selecting one of said tool indicators of said toolbar image, using said pointer device, to perform a playback, stop, record, rewind or fast-forward on said first voice-mail message;

deselecting said first voice-mail message and automatically storing, at a first memory location in said memory, an indication of a position, based on a current position within said first voice-mail message;

selecting a second voice-mail message using said pointer device, without displaying, in response, a second toolbar image;

selecting one of said tool indicators of said first toolbar image, using said pointer device, to perform an operation selected from the group consisting of a playback, record, rewind and fast-forward on said second voice-mail message; and terminating said operation on said second voice-mail message and automatically storing, at a second memory location in said memory, an indication of a position, based on a current position, within said second voice-mail message.

22. Apparatus for centralized control of a plurality of sequential-playback objects, comprising:

a computer, having a memory with a plurality of memory storage locations, a video display device and a pointing device;

said computer controlling said video display to display a plurality of object identifiers which identify stored digital objects, including at least first and second object identifiers which identify first and second sequential-playback objects;

said computer controlling said video display to highlight said first object identifier, following selecting said first object identifier, using said user-controllable selection device;

said computer controlling said video display to display a plurality of control identifiers, including at least a playback control identifier;

a playback device, coupled to said computer for performing sequential playback of said first sequential-playback object in response to selecting of said playback control identifier, using said pointer device;

said computer automatically storing, at a first memory location in said memory, an indication of a position, based on a current position within said first sequential-playback object in response to deselection of said first object identifier;

said computer controlling said video display to highlight said second object identifier in response to selecting said second object identifier using said pointing device;

said playback device performing sequential playback of said second sequential-playback object in response to selecting of said playback control identifier, using said pointing device; and said computer automatically storing, at a second memory location in said memory, an indication of a position, based on a current position within said second sequential-playback object, in response to termination of said sequential playback of said second sequential-playback object.

23. Apparatus for using a computer for centralized control of a plurality of sequential-playback objects, the computer including a memory having a plurality of memory locations, a display device and a user-controllable selection device, comprising:

means for displaying, on said display device, a plurality of object identifiers which identify stored digital objects, including at least first and second object identifiers which identify first and second sequential-playback objects;

means for selecting said first object identifier, using said user-controllable selection device;

means for displaying a plurality of control identifiers, including at least a playback control identifier;

means for selecting said playback control identifier;

means for initiating sequential playback of said first sequential-playback object in response to said selecting of said playback control identifier;

means for automatically storing, at a first memory storage location in said memory an indication of a position based on a current position within said first sequential-playback object in response to deselection of said first object identifier;

means for selecting said playback control identifier;

means for initiating sequential playback of said second sequential-playback object in response to said selecting of said playback control identifier; and means for automatically storing, at a second memory location in said memory, an indication of a position based on a current position within said second sequential-playback object in response to termination of said sequential playback of said second sequential-playback object.

\* \* \* \* \*